(12) United States Patent
Colson et al.

(10) Patent No.: US 10,202,802 B2
(45) Date of Patent: Feb. 12, 2019

(54) CONTROL OF ARCHITECTURAL OPENING COVERINGS

(71) Applicant: Hunter Douglas Inc., Pearl River, NY (US)

(72) Inventors: Wendell B. Colson, Weston, MA (US); Daniel M. Fogarty, Framingham, MA (US); Paul G. Swiszcz, Niwot, CO (US)

(73) Assignee: Hunter Douglas Inc., Pearl River, NY (US)

( * ) Notice: Subject to any disclaimer, the term of this patent is extended or adjusted under 35 U.S.C. 154(b) by 263 days.

(21) Appl. No.: 15/133,050

(22) Filed: Apr. 19, 2016

(65) Prior Publication Data

US 2016/0230460 A1   Aug. 11, 2016

Related U.S. Application Data

(63) Continuation of application No. 14/349,628, filed as application No. PCT/US2012/000429 on Oct. 3, 2012, now Pat. No. 9,334,688.

(Continued)

(51) Int. Cl.
*E06B 9/24* (2006.01)
*E06B 9/74* (2006.01)
(Continued)

(52) U.S. Cl.
CPC .......... *E06B 9/74* (2013.01); *E06B 9/264* (2013.01); *E06B 9/32* (2013.01); *E06B 9/322* (2013.01);
(Continued)

(58) Field of Classification Search
CPC ..... E06B 9/42; E06B 9/74; E06B 9/32; E06B 9/40
(Continued)

(56) References Cited

U.S. PATENT DOCUMENTS 1,678,790 A   7/1928 Salesse
1,725,285 A   8/1929 Lalonde
(Continued)

FOREIGN PATENT DOCUMENTS

AU   2010901077   3/2010
CN   1331945   1/2002
(Continued)

OTHER PUBLICATIONS

Patent Cooperation Treaty, "International Search Report," issued in connection with Application No. PCT/US2012/000429, dated Dec. 17, 2012, 3 pages.
(Continued)

*Primary Examiner* — Katherine W Mitchell
*Assistant Examiner* — Abe Massad
(74) *Attorney, Agent, or Firm* — Hanley, Flight & Zimmerman, LLC

(57) ABSTRACT

Apparatus and methods for controlling architectural opening coverings are described herein. An example apparatus includes a roller tube, a motor including a motor drive shaft and a motor casing, the motor casing to rotate with the roller tube, and a manual control including a manual control drive shaft coupled to the motor drive shaft, the motor to apply torque to the roller tube through rotation of the motor casing.

22 Claims, 16 Drawing Sheets

Related U.S. Application Data

(60) Provisional application No. 61/542,760, filed on Oct. 3, 2011, provisional application No. 61/648,011, filed on May 16, 2012.

(51) Int. Cl.

| | |
|---|---|
| *E06B 9/32* | (2006.01) |
| *E06B 9/40* | (2006.01) |
| *E06B 9/68* | (2006.01) |
| *E06B 9/42* | (2006.01) |
| *F16H 59/02* | (2006.01) |
| *E06B 9/72* | (2006.01) |
| *E06B 9/264* | (2006.01) |
| *E06B 9/322* | (2006.01) |
| *E06B 9/78* | (2006.01) |
| *E06B 9/26* | (2006.01) |
| *E06B 9/262* | (2006.01) |

(52) U.S. Cl.
CPC ............... *E06B 9/40* (2013.01); *E06B 9/42* (2013.01); *E06B 9/68* (2013.01); *E06B 9/72* (2013.01); *E06B 9/78* (2013.01); *F16H 59/0278* (2013.01); *E06B 9/26* (2013.01); *E06B 2009/2429* (2013.01); *E06B 2009/2627* (2013.01); *E06B 2009/6809* (2013.01); *E06B 2009/6818* (2013.01); *E06B 2009/6845* (2013.01); *E06B 2009/6854* (2013.01); *E06B 2009/785* (2013.01); *Y10T 74/2014* (2015.01)

(58) Field of Classification Search
USPC ........................................... 74/625; 160/321
See application file for complete search history.

(56) References Cited

U.S. PATENT DOCUMENTS

| | | | |
|---|---|---|---|
| 1,786,512 A | 12/1930 | Whitworth | |
| 2,020,595 A | 11/1935 | Weber | |
| 2,276,740 A | 3/1942 | Saito | |
| 2,678,094 A | 5/1954 | Sargent | |
| 2,878,865 A | 3/1959 | Manley | |
| 2,951,920 A | 9/1960 | Miller | |
| 3,186,473 A | 6/1965 | Myers et al. | |
| 3,521,693 A * | 7/1970 | Kuss | A47H 5/00 160/243 |
| 3,732,914 A | 5/1973 | Flageollet | |
| 3,825,809 A | 7/1974 | Gatland et al. | |
| 3,853,167 A | 12/1974 | Wardlaw | |
| 3,965,960 A | 6/1976 | Massey | |
| 4,085,345 A | 4/1978 | Bullat | |
| 4,112,996 A | 9/1978 | Föhl | |
| 4,247,744 A | 1/1981 | Birkle | |
| 4,372,367 A | 2/1983 | Baldanello et al. | |
| 4,413,665 A | 11/1983 | Corcoran | |
| 4,417,185 A | 11/1983 | Bullat | |
| 4,472,910 A | 9/1984 | Iha | |
| 4,519,487 A | 5/1985 | Florin | |
| 4,519,554 A | 5/1985 | Dussoliet et al. | |
| 4,560,046 A | 12/1985 | Lorello et al. | |
| 4,618,804 A | 10/1986 | Iwasaki | |
| 4,651,940 A * | 3/1987 | Nakamura | E06L 9/72 160/310 |
| 4,673,018 A | 6/1987 | Judkins | |
| 4,687,038 A | 8/1987 | Clemente | |
| 4,712,104 A | 12/1987 | Kobayashi | |
| 4,762,159 A | 8/1988 | Ford | |
| 4,766,941 A | 8/1988 | Sloop et al. | |
| 4,794,715 A | 1/1989 | Cherwin | |
| 4,807,686 A | 2/1989 | Schnebly et al. | |
| 4,813,468 A | 3/1989 | Fraser | |
| 4,842,034 A | 6/1989 | Haines | |
| 4,850,414 A | 7/1989 | Lessard | |
| 4,972,129 A | 11/1990 | Kawai et al. | |
| 4,979,603 A | 12/1990 | Wheatland | |
| 5,039,925 A | 8/1991 | Schap | |
| 5,044,417 A | 9/1991 | Bresson | |
| 5,105,871 A | 4/1992 | Baud et al. | |
| 5,299,678 A | 4/1994 | Chang et al. | |
| 5,547,009 A | 8/1996 | Plumer | |
| 5,598,000 A | 1/1997 | Popat | |
| 5,663,621 A | 9/1997 | Popat | |
| 5,671,387 A | 9/1997 | Jacobs et al. | |
| 5,675,487 A | 10/1997 | Patterson et al. | |
| 5,709,349 A | 1/1998 | Villette et al. | |
| 5,711,360 A | 1/1998 | Viotte | |
| 5,793,174 A | 8/1998 | Kovach et al. | |
| 5,794,381 A | 8/1998 | Rizkovsky | |
| 5,799,716 A | 9/1998 | Yamaguchi et al. | |
| 5,803,150 A | 9/1998 | Boiteau | |
| 5,839,555 A | 11/1998 | Hsieh | |
| 5,848,634 A | 12/1998 | Will et al. | |
| 5,860,464 A | 1/1999 | Schön | |
| 5,924,949 A | 7/1999 | Fan | |
| 5,975,185 A | 11/1999 | Miller et al. | |
| 6,055,885 A * | 5/2000 | Shea | E06B 9/74 160/310 |
| 6,082,433 A | 7/2000 | Vafaie et al. | |
| 6,104,156 A | 8/2000 | Bruno | |
| 6,111,376 A | 8/2000 | Jean-Marc | |
| 6,158,563 A | 12/2000 | Welfonder et al. | |
| 6,181,089 B1 | 1/2001 | Kovach et al. | |
| 6,186,211 B1 | 2/2001 | Knowles | |
| 6,196,292 B1 | 3/2001 | Jackson | |
| 6,244,325 B1 | 6/2001 | Miller et al. | |
| 6,259,218 B1 | 7/2001 | Kovach et al. | |
| 6,341,638 B1 | 1/2002 | Thompson et al. | |
| 6,346,889 B1 | 2/2002 | Moss | |
| 6,381,903 B1 | 5/2002 | Desrochers et al. | |
| 6,497,267 B1 | 12/2002 | Azar et al. | |
| 6,571,853 B1 | 6/2003 | Ciuca et al. | |
| 6,628,029 B2 | 9/2003 | Astegno | |
| 6,680,594 B2 | 1/2004 | Collett et al. | |
| 6,733,413 B2 | 5/2004 | Lagarde et al. | |
| 6,751,909 B2 | 6/2004 | Ranaudo | |
| 6,810,997 B2 | 11/2004 | Schreiber et al. | |
| 6,843,301 B2 | 1/2005 | Carrillo et al. | |
| 6,843,303 B2 | 1/2005 | Siak et al. | |
| 6,979,962 B2 | 12/2005 | Cavarec | |
| 7,028,737 B2 | 4/2006 | Hsu | |
| 7,089,991 B2 | 8/2006 | Jorgensen | |
| 7,134,474 B2 | 11/2006 | Lagarde et al. | |
| 7,161,100 B1 | 1/2007 | Hsieh | |
| 7,234,503 B2 | 6/2007 | Kwak | |
| 7,240,582 B1 | 7/2007 | Manaras et al. | |
| 7,240,715 B2 | 7/2007 | Hoffmann | |
| 7,261,139 B2 | 8/2007 | Varley et al. | |
| 7,264,034 B2 | 9/2007 | Lin | |
| D553,079 S | 10/2007 | Poulet et al. | |
| 7,466,090 B2 | 12/2008 | Meewis et al. | |
| 7,481,133 B2 | 1/2009 | Walravens et al. | |
| 7,513,292 B2 | 4/2009 | Auger et al. | |
| 7,599,612 B2 | 10/2009 | Moseley et al. | |
| 7,726,379 B2 | 6/2010 | Beau | |
| 7,740,045 B2 | 6/2010 | Anderson et al. | |
| 7,770,961 B2 | 8/2010 | Oxley | |
| 7,832,450 B2 | 11/2010 | Brace et al. | |
| 7,839,109 B2 | 11/2010 | Carmen, Jr. et al. | |
| 7,857,033 B2 | 12/2010 | Malausa | |
| 8,037,922 B2 | 10/2011 | Hawkins et al. | |
| 8,125,167 B1 | 2/2012 | Mullet et al. | |
| 8,339,086 B2 | 12/2012 | Feldstein et al. | |
| 8,368,328 B2 | 2/2013 | Mullet et al. | |
| 8,575,872 B2 | 11/2013 | Mullet et al. | |
| 8,662,139 B2 | 3/2014 | Anthony et al. | |
| 8,723,454 B2 | 5/2014 | Skinner et al. | |
| 8,910,695 B2 | 12/2014 | Knight | |
| 8,931,541 B2 | 1/2015 | Chambers et al. | |
| 8,947,027 B2 | 2/2015 | Mullet et al. | |
| 9,181,750 B2 | 11/2015 | Ticoalu et al. | |
| 9,765,568 B2 | 9/2017 | Colson et al. | |
| 2002/0011262 A1 | 1/2002 | Dieckmann | |
| 2002/0153854 A1 | 10/2002 | Reed et al. | |

(56) References Cited

U.S. PATENT DOCUMENTS

| | | |
|---|---|---|
| 2002/0190678 A1 | 12/2002 | Huber et al. |
| 2004/0011477 A1 | 1/2004 | Walker et al. |
| 2004/0169490 A1 | 9/2004 | Heurtault |
| 2004/0169940 A1 | 9/2004 | Yoshida |
| 2005/0035238 A1 | 2/2005 | Fun |
| 2005/0051283 A1 | 3/2005 | Chatellard |
| 2005/0150608 A1 | 7/2005 | Auger et al. |
| 2005/0173080 A1 | 8/2005 | Carmen, Jr. et al. |
| 2005/0253710 A1 | 11/2005 | Eskildsen |
| 2006/0042763 A1 | 3/2006 | Le Ru |
| 2006/0042765 A1 | 3/2006 | Varley et al. |
| 2006/0086874 A1 | 4/2006 | Habel et al. |
| 2006/0243401 A1* | 11/2006 | Chen ..................... E06B 9/74 160/310 |
| 2008/0052034 A1 | 2/2008 | David et al. |
| 2008/0111511 A1 | 5/2008 | Kang et al. |
| 2008/0223532 A1 | 9/2008 | Auger |
| 2008/0283200 A1 | 11/2008 | Hummel et al. |
| 2009/0005911 A1 | 1/2009 | Decroix et al. |
| 2009/0025888 A1 | 1/2009 | Brace et al. |
| 2009/0173456 A1 | 7/2009 | Rodas et al. |
| 2009/0256021 A1 | 10/2009 | Dorrough |
| 2010/0006240 A1 | 1/2010 | Cieslik |
| 2010/0018654 A1 | 1/2010 | Skinner et al. |
| 2010/0109850 A1 | 5/2010 | Kovach et al. |
| 2010/0191409 A1 | 7/2010 | Weston |
| 2010/0200176 A1 | 8/2010 | Magli |
| 2010/0236891 A1 | 9/2010 | Lagarde et al. |
| 2010/0244602 A1 | 9/2010 | Perret et al. |
| 2010/0279779 A1 | 11/2010 | Anthoine |
| 2011/0048655 A1 | 3/2011 | Andreasen |
| 2011/0073262 A1 | 3/2011 | Frede |
| 2011/0203748 A1 | 8/2011 | Mullet et al. |
| 2011/0203754 A1 | 8/2011 | Mullet et al. |
| 2013/0140130 A1 | 6/2013 | Dang |
| 2013/0199735 A1 | 8/2013 | Colson et al. |
| 2014/0090787 A1 | 4/2014 | Colson et al. |
| 2014/0133019 A1 | 5/2014 | Mullet et al. |
| 2014/0224437 A1 | 8/2014 | Colson et al. |
| 2014/0262058 A1 | 9/2014 | Mullet et al. |
| 2014/0262078 A1 | 9/2014 | Colson et al. |
| 2014/0290870 A1 | 10/2014 | Colson et al. |
| 2015/0090409 A1 | 4/2015 | Mullet et al. |

FOREIGN PATENT DOCUMENTS

| | | |
|---|---|---|
| CN | 2823518 | 10/2006 |
| CN | 1981311 | 6/2007 |
| CN | 201202392 | 3/2009 |
| CN | 201943550 | 8/2011 |
| CN | 102333469 | 1/2012 |
| DE | 29818023 | 12/1998 |
| DE | 202011051106 | 9/2011 |
| EP | 0783072 | 7/1997 |
| EP | 0838574 | 4/1998 |
| EP | 0940553 | 9/1999 |
| EP | 1659256 | 5/2006 |
| EP | 2192249 | 6/2010 |
| JP | S59230942 | 12/1984 |
| JP | 622797 | 1/1987 |
| JP | 253496 | 4/1990 |
| JP | 74774 | 1/1995 |
| JP | 08199950 | 8/1996 |
| JP | H1046961 | 2/1998 |
| JP | 200270465 | 3/2002 |
| JP | 2002070465 | 3/2002 |
| JP | 2004190476 | 7/2004 |
| JP | 2004237362 | 8/2004 |
| JP | 20062531 | 1/2006 |
| JP | 2006233418 | 9/2006 |
| WO | WO0241740 | 5/2002 |
| WO | WO2010011751 | 1/2010 |
| WO | WO2011113094 | 9/2011 |

OTHER PUBLICATIONS

Patent Cooperation Treaty, "Written Opinion of the International Searching Authority," issued in connection with Application No. PCT/US2012/000429, dated Dec. 17, 2012, 5 pages.

Patent Cooperation Treaty, "International Search Report," issued in connection with Application No. PCT/US2012/000428, dated Dec. 21, 2012, 3 pages.

Patent Cooperation Treaty, "Written Opinion of the International Searching Authority," issued in connection with Application No. PCT/US2012/000428, dated Dec. 21, 2012, 6 pages.

Patent Cooperation Treaty, "International Preliminary Report on Patentability," issued in connection with Application No. PCT/US2011/038469, dated Dec. 13, 2012, 10 pages.

Patent Cooperation Treaty, "International Search Report," issued in connection with Application No. PCT/US2011/038469, dated Sep. 23, 2011, 4 pages.

Patent Cooperation Treaty, "Written Opinion of the International Searching Authority," issued in connection with Application No. PCT/US2011/038469, dated Sep. 23, 2011, 7 pages.

International Bureau, "International Preliminary Report on Patentability," issued in connection with application No. PCT/US2012/000429, dated Apr. 17, 2014, 7 pages.

International Bureau, "International Preliminary Report on Patentability," issued in connection with application No. PCT/US2012/000428, dated Apr. 17, 2014, 8 pages.

International Searching Authority, "International Search Report and Written Opinion of the Internatinal Searching Authority," issued in connection with application No. PCT/US2014/028534, dated Aug. 5, 2014, 11 pages.

European Patent Office, "Extended European Search Report," issued in connection with European application No. 13186952.1, dated Jan. 9, 2015, 9 pages.

Patent Cooperation Treaty, "International Preliminary Report on Patentability," issued in connection with International Application No. PCT/US2012/023981, dated Aug. 13, 2013, 7 pages.

Patent Cooperation Treaty, "International Search Report," issued by the International Searching Authority in connection with PCT application No. PCT/US2012/023981, dated May 23, 2012, 2 pages.

Patent Cooperation Treaty, "Written Opinion of the International Searching Authority," issued by the International Searching Authority in connection with PCT/US2012/023981, dated May 23, 2012, 6 pages.

United States Patent and Trademark Office, "Final Office Action," issued in connection with U.S. Appl. No. 12/816,152, dated Jul. 9, 2013, 9 pages.

United States Patent and Trademark Office, "Non-Final Office Action" issued in connection with U.S. Appl. No. 12/816,152, dated Nov. 20, 2012, 12 pages.

United States Patent and Trademark Office, "Non-Final Office Action" issued in connection with U.S. Appl. No. 14/044,832, dated Nov. 6, 2014, 26 pages.

United States Patent and Trademark Office, "Non-Final Office Action," issued in connection with U.S. Appl. No. 12/816,152, dated May 31, 2012, 14 pages.

United States Patent and Trademark Office, "Non-Final Office Action," issued in connection with U.S. Appl. No. 13/367,000, dated Sep. 18, 2014, 29 pages.

United States Patent and Trademark Office, "Notice of Allowance," issued in connection with U.S. Appl. No. 12/816,152, dated Oct. 23, 2013, 19 pages.

United States Patent and Trademark Office, "Non-Final Office Action" issued in connection with U.S. Appl. No. 14/349,628 dated Jun. 2, 2015, 85 pages.

Japanese Patent Office, "Office Action," issued in connection with application No. 2013-512066 dated Apr. 21, 2015, 7 pages.

State Intellectual Property Office, "Search Report," with English Translation issued in connection with application No. 2012800520005 dated Apr. 20, 2015, 2 pages.

United States Patent and Trademark Office, "Non-Final Office Action," issued in connection with U.S. Appl. No. 13/699,580, dated Jul. 2, 2015, 32 pages.

(56) References Cited

OTHER PUBLICATIONS

United States Patent and Trademark Office, "Restriction Requirement," issued in connection with U.S. Appl. No. 14/346,629, dated Jul. 31, 2015, 10 pages.

Somfy, "Motor Catalog", Sonfy Systems, Inc., Dec. 2013, http://www.usautomated.com/vendors/catalogs/so mfy/Motor_Catalog.pdf, 78 pages.

SOMFY, "Motor for Awnings", Somfy LT CSI WT—SOMFY, "Motor for Awnings", Somfy LT CSI WT-Automatic manual override, http://www.somfy.co.uk/product/en-uk/lt-csi-wt/1440.cfm?channel=pro, retrieved on Nov. 22, 2010, 1 page.

SOMFY, "The Motor With Back-Up Operation for Terrace Awnings", http://www.somfy.co.uk/product/en-uk/lt-csi-rts/1439.cfm?channel=pro, retrieved on Nov. 22, 2010, 1 page.

SOMFY, "Sunea RTS CMO Universal Performance", Somfy Systems, INC. North America Headquarters, Aug. 2009, 2 pages.

SOMFY, "Sunea RTS CMO (Compact Manual Override)", Somfy Systems INC., Feb. 2015, 1 page.

Patent Cooperation Treaty, "International Preliminary Report on Patentability", issued in connection with international application No. PCT/US2014/028534, dated Sep. 15, 2015, 6 pages.

United States Patent and Trademark Office, "Final Office Action," issued in connection with U.S. Appl. No. 14/044,832, dated Dec. 8, 2015, 53 pages.

United States Patent and Trademark Office, "Non-Final Office Action," issued in connection with U.S. Appl. No. 14/349,629, dated Dec. 17, 2015, 51 pages United States Patent and Trademark Office, "Notice of Allowance," issued in connection with U.S. Appl. No. 14/349,628, dated Jan. 6, 2016, 48 pages.

United States Patent and Trademark Office, "Final Office Action," issued in connection with U.S. Appl. No. 13/699,580, dated Mar. 11, 2016, 40 pages.

United States Patent and Trademark Office, "Non-Final Office Action," issued in connection with U.S. Appl. No. 14/044,832, dated May 19, 2016, 38 pages.

United States Patent and Trademark Office, "Non-final Office Action," issued in connection with U.S. Appl. No. 14/044,832, dated Mar. 20, 2017, 20 pages.

Columbian Patent Office,"Examination Report," issued in connection with application No. 14-093599, dated Nov. 12, 2016, 12 pages.

United States Patent and Trademark Office, "Notice of Allowance," issued in connection with U.S. Appl. No. 14/349,629, dated May 16, 2017, 17 pages.

United States Patent and Trademark Office, "Notice of Allowance," issued in connection with U.S. Appl. No. 13/699,580, dated Jun. 13, 2017, 8 pages.

United States Patent and Trademark Office, "Final Office Action," issued in connection with U.S. Appl. No. 14/044,832, dated Sep. 29, 2017, 27 pages.

United States Patent and Trademark Office, "Final Office Action," issued in connection with U.S. Appl. No. 14/349,629, dated Jun. 27, 2016, 17 pages.

United States Patent and Trademark Office, "Non-Final Office Action," issued in connection with U.S. Appl. No. 14/349,629, dated Nov. 1, 2016, 17 pages.

United States Patent and Trademark Office, "Non-Final Office Action," issued in connection with U.S. Appl. No. 13/699,580, dated Nov. 16, 2016, 17 pages.

* cited by examiner

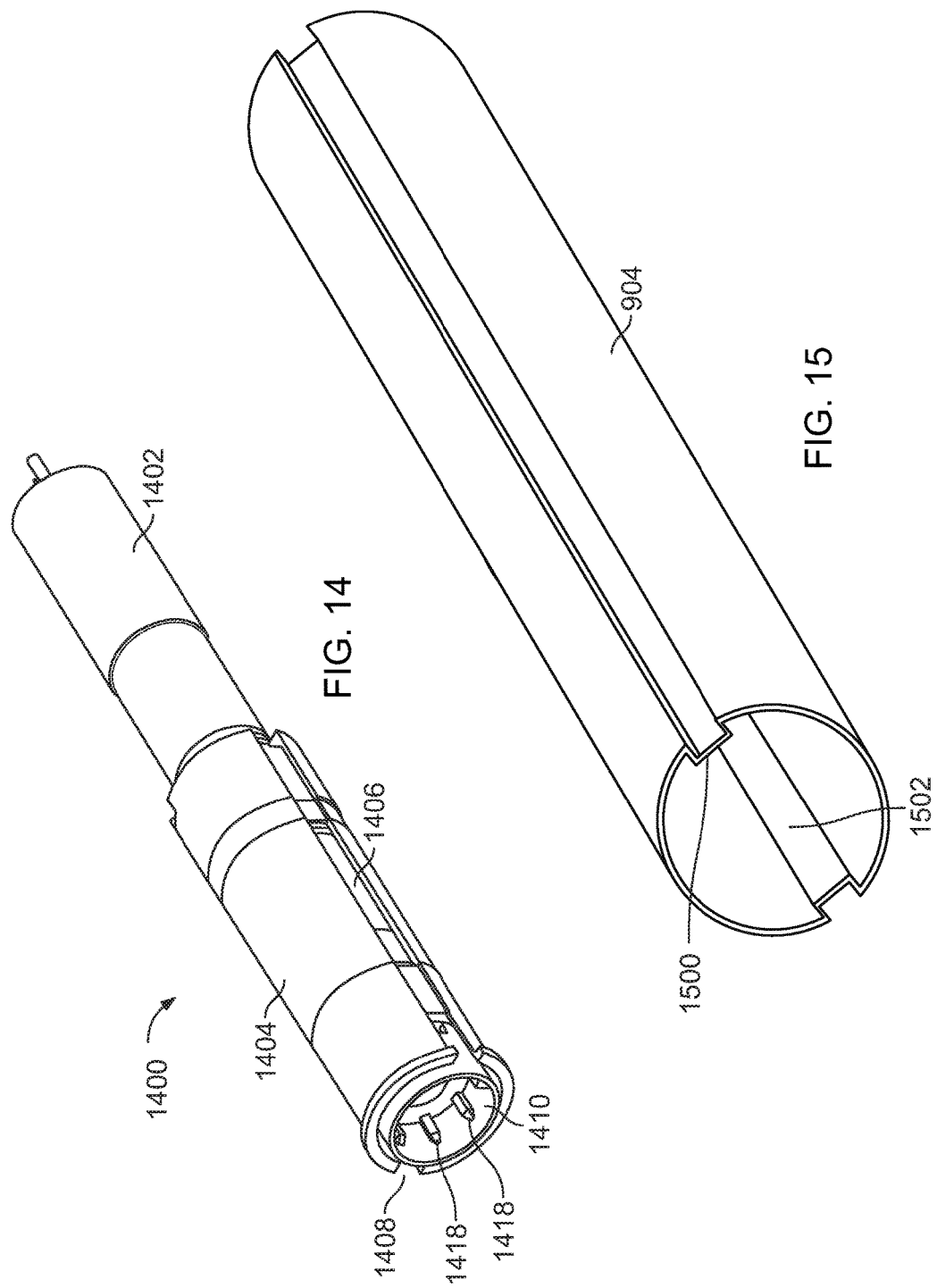

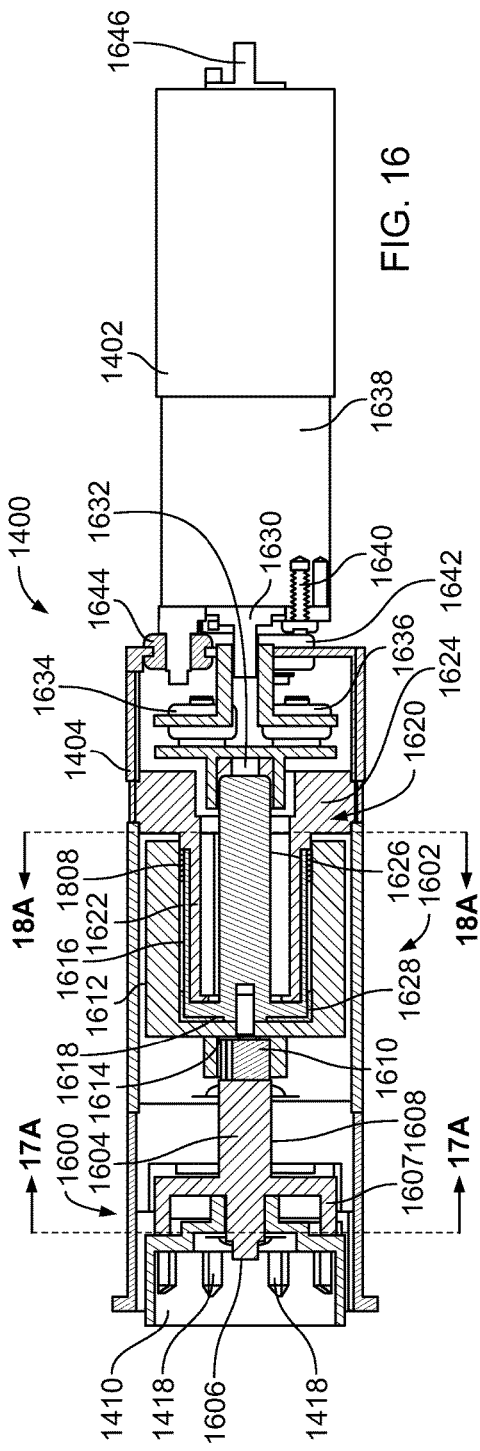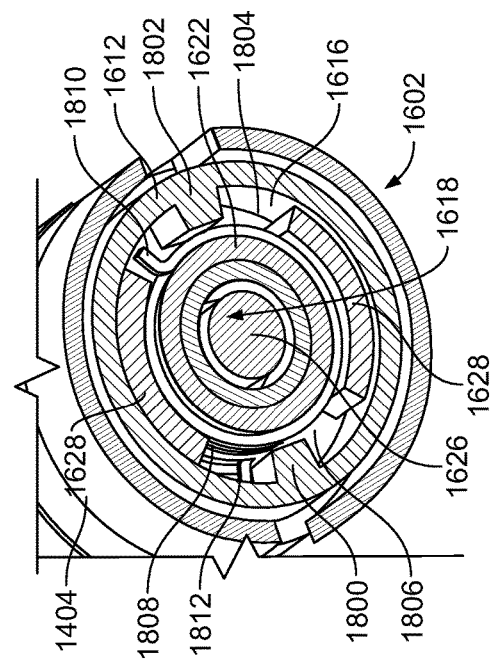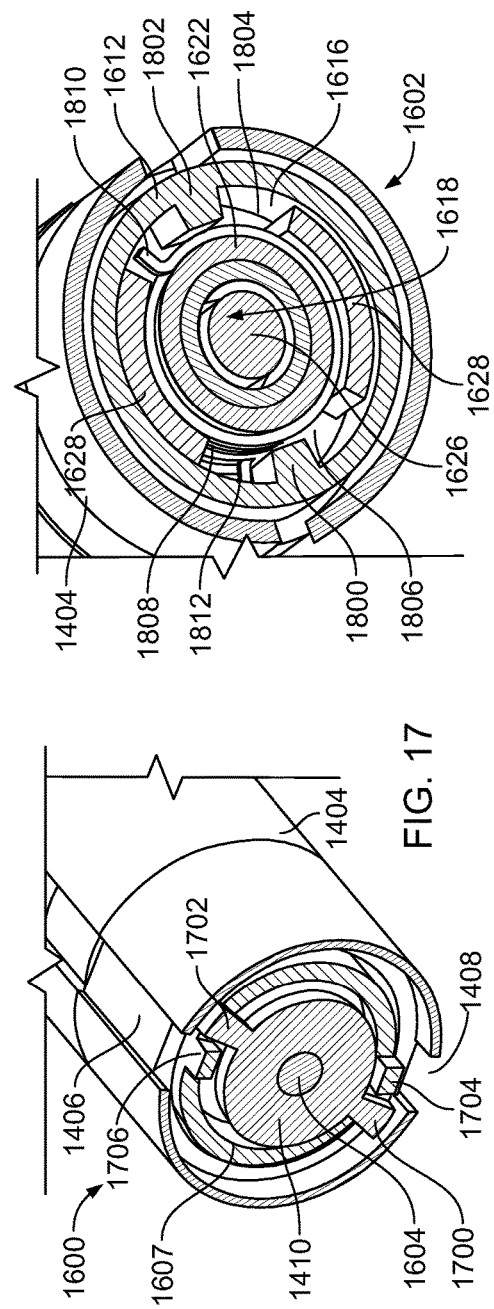

CONTROL OF ARCHITECTURAL OPENING COVERINGS

RELATED APPLICATIONS

This patent is a continuation of U.S. patent application Ser. No. 14/349,628, entitled "CONTROL OF ARCHITECTURAL OPENING COVERINGS," filed on Oct. 3, 2014, which is a § 371 national stage of PCT Application No. PCT/US2012/000429, filed Oct. 3, 2012, entitled "CONTROL OF ARCHITECTURAL OPENING COVERINGS," which claims the benefit of U.S. Provisional Application Ser. No. 61/542,760, entitled "CONTROL OF ARCHITECTURAL OPENING COVERINGS," filed Oct. 3, 2011 and claims the benefit of U.S. Provisional Application Ser. No. 61/648,011, entitled "METHODS AND APPARATUS TO CONTROL ARCHITECTURAL OPENING COVERING ASSEMBLIES," filed May 16, 2012. The disclosures of U.S. patent application Ser. No. 14/349,628, PCT Application No. PCT/US2012/000429, U.S. Provisional Application Ser. No. 61/542,760 and U.S. Provisional Application Ser. No. 61/648,011 are hereby incorporated herein by reference in their entireties.

FIELD OF THE DISCLOSURE

This disclosure relates generally to architectural opening covering assemblies and, more particularly, to methods and apparatus to control architectural opening covering assemblies.

BACKGROUND

Architectural opening coverings such as roller blinds provide shading and privacy. Such coverings typically include a manually operated cord, chain or pull tube or a motorized roller tube connected to covering fabric, which may be slatted or louvered. The fabric can be fitted with a bottom rail and optionally run through a pair of opposing vertical frame or track members, one for each side edge of the fabric, so that the fabric raises and falls in a designated path and is not subjected to motion from, for example, blowing wind.

BRIEF DESCRIPTION OF THE DRAWINGS

Example implementations of architectural opening coverings will be described through the use of the accompanying drawings, which are not to be considered as limiting, and in which:

FIG. 14 is a perspective view of an example clutch assembly and motor of the example architectural opening covering assembly of FIG. 9.

FIG. 15 is a perspective view of an example roller tube of the example architectural opening covering assembly of FIG. 9.

FIG. 16 is a cross-sectional view of the example clutch assembly and the example motor of FIG. 14.

FIG. 17 is a cross-sectional view of an example first clutch of the example clutch assembly of FIG. 16 taken along line 17A-17A.

FIG. 18 is a cross-sectional view of an example second clutch of the example clutch assembly of FIG. 16 taken along line 18A-18A.

DETAILED DESCRIPTION

To lower a roller type architectural opening covering such as a blind with a weighted rail a manual control is provided. In some examples, the architectural opening covering with the manual control may also be motorized. In some implementations that include a motor, the manual control does not cause the covering to be about of synchronization with any components for limiting the travel of the covering (e.g., mechanical or electronic limit switches). Accordingly, in such implementations, operation of the manual control does not necessitate recalibration or resetting of the components for limiting the travel of the covering.

The components of the architectural opening covering will be referenced in polar coordinates. For example, the axial coordinate runs along the longitudinal axis of the covering, the radial coordinate runs perpendicularly thereto and the circumferential coordinate runs in a circular direction in an end view of the covering. With the covering in a plan view, "axial proximate" or "proximate" means closer to the right side of the figure. On the other hand, "axial distal" or "distal" means further from the right side of the figure.

Figure 1:
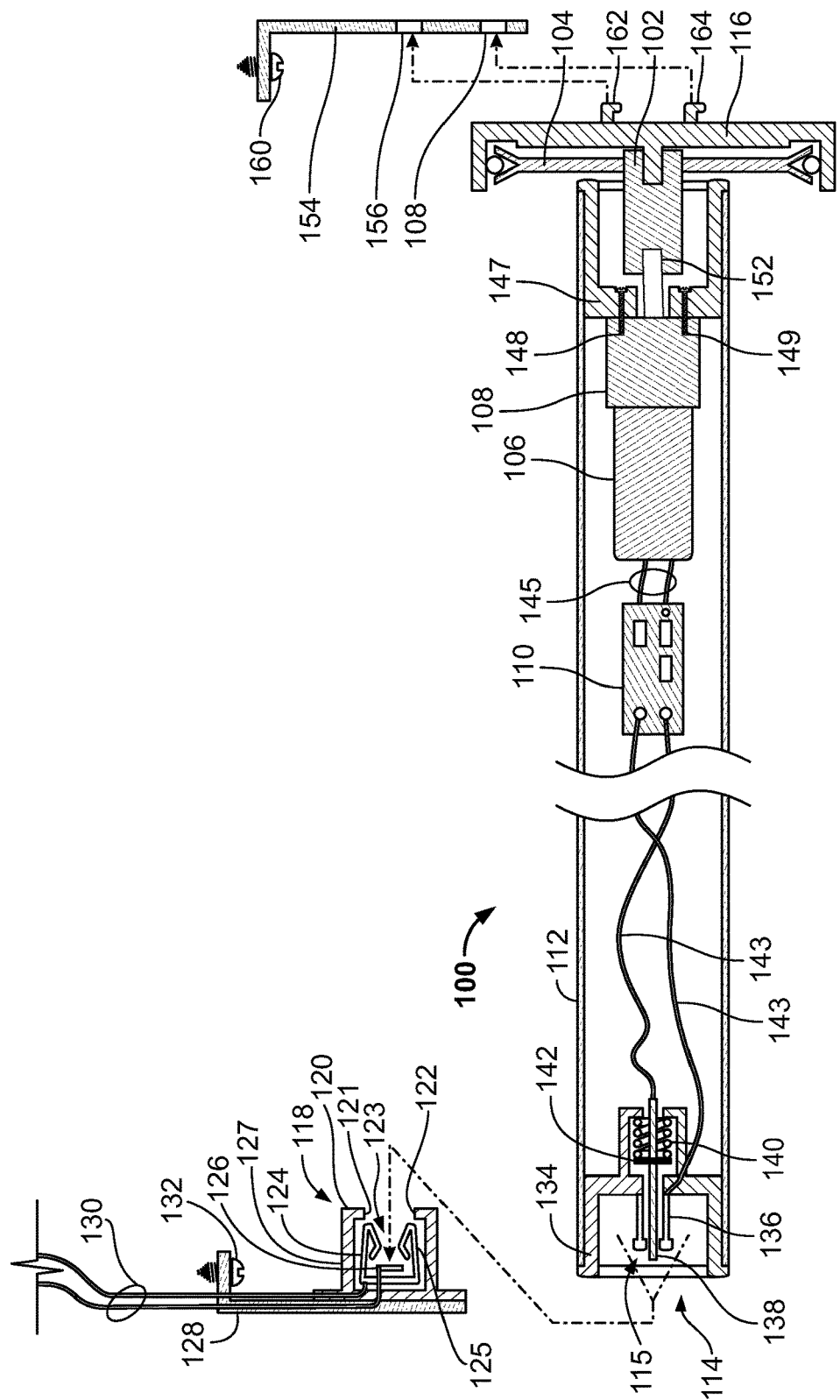
FIG. 1 illustrates an example implementation of a roller type architectural opening covering with a manual control.

FIG. 1 illustrates an example covering 100 that includes a shaft connector 102 and a manual control 104. The shaft connector 102 may be a one-way slipping bearing as described in FIGS. 7 and 8. As will be explained in further detail, the manual control 104 enables manual operation of the covering 100 by a person (e.g., when motorized control is not available or desirable to the person).

The roller blind 100 of the illustrated example includes the one-way slipping bearing 102, the manual control 104, the motor 106, a gearbox 108, a control board 110, a roller tube 112, a slip-ring connector 114, and a clutch/mount 116. In the illustrated example, the motor 106 and the manual control 104 are located nearest the proximate side of the covering 100. Alternatively, components of the covering 100 could be reversed so that the motor 106 and the manual control 104 are located nearest the distal side of the covering 100.

The slip-ring connector 114 of the illustrated example is insertable in a mating connector 118 for mounting the covering 100 in or adjacent to an architectural opening and for electrically connecting the covering 100 to electrical power. The example slip-ring connector 114 includes a frame 120 having first and second edges 121, 122 defining an opening 123 into which an axially extending protrusion 115 of the slip-ring connector 114 is inserted when the covering 100 is mounted in or adjacent to the architectural opening. An outer radial surface 127 of the frame 114 receives an inner radial surface of a bracket 134 of the slip-ring connector 114.

Disposed inside frame 120 are first contacts 124, 125 and second contact 126. The first contacts 124, 125 of the illustrated example comprise two metal flanges bent over to form a deformable metal contact. The first contacts 124, 125 are electrically connected to supply wires 130 that supply electrical power to the mating connector 118. When the covering 100 is mounted in the mating connector 118, the first contacts 124, 125 rest upon a radial ring 136 of the axially extending protrusion 115. When the covering 100 rotates, the first contacts 124, 125 maintain an electrical connection with the radial ring 136. Accordingly, the covering can rotate with respect to the mating connector 118 while an electrical connection is maintained. While two first contacts 124, 125 are included in the illustrated example, any number of contact(s) (e.g., 1, 3, 4, etc.) may alternatively be used.

The second contact 126 of the illustrated example comprises a metal flange upon which rests a pin 138 that extends beyond a distal end of the axially extending protrusion 115. The second contact 126 is electrically connected to the supply wires 130. While the covering 100 rotates, the second contact 126 maintains the electrical connection with the pin 138 to provide electrical power to the covering 100.

The example frame 120 of FIG. 1 is fixed to a bracket 128 that is fixed in or adjacent to an architectural opening using a mechanical fastener such as a screw 132. In the illustrated example, the supply wires 130 pass through openings (not illustrated) in the bracket 128 and the frame 130.

While an example mating connector 118 is disclosed herein, other arrangements may be used. For example, other configurations of slip-ring connectors may be used.

Returning to the example covering 100, the bracket 134 is disposed inside of, and is fixed to, the roller tube 112. The pin 138 is disposed in a sleeve formed inside the connector. A washer 142 is mounted to the pin 138. A spring 140 is seated between the fixed washer 142 and an inner surface of the bracket 134. The force of the spring 140 biases the pin 138 in the distal direction and into engagement with the second contact 126 when the covering 100 is inserted in the mating connector 118.

Wires 143 electrically connect the pin 138 and the radial ring 136, respectively, to the control board 110. Accordingly, electrical power is supplied to the control board 110 when the covering 100 is mounted in the mating bracket 118 and electrical power is supplied to the supply wires 130. In other examples, batteries may provide power to the control board 110 and the corresponding wired electrical elements may be eliminated. In such examples, the slip-ring connector 114 may not include components for electrical connection, but will provide mounting support for the roller blind 100.

The control board 110 of the illustrated example controls the operation of the covering 100. In particular, the example control board 110 includes a wireless receiver and a torque sensing control. The wireless receiver is responsive to commands from a wireless remote control to direct the operation of the covering 100. The torque sensing control operates to stop the motor 106 whenever a torque overload is detected (e.g., when the covering 100 is fully wound, when the covering 100 is fully unwound, or when an obstruction prevents winding/unwinding of the covering 100). The example torque sensing control of the illustrated example includes a winding threshold and an unwinding threshold such that the winding threshold is greater than the unwinding threshold due to the additional torque encountered when winding the covering 100. Alternatively, a single threshold may be used. The control board 110 may include additional circuitry or electronics for the covering 100 such as, for example, a motor controller.

Other methods for stopping the motor 106 may be used such as, for example, a mechanical or electrical limiter switch/control (e.g., limiter switches/controls disclosed herein) may be used. Alternatively, a one-way slipping bearing may be used as described in FIG. 2. In some such examples, no torque sensing control or limiter switches/controls will be used. In some such examples, the control board 110 includes a timer control to stop the motor 106 after an amount of time sufficient to fully wind or fully unwind the roller blind 100.

The control board 110 of the illustrated example is electrically connected to the motor 106 via wires 145. The motor 106 of the illustrated example is an electric motor having an output shaft. The output shaft of the motor 106 is disposed on the proximate side while the radial body (e.g., shell or casing) of the motor 106 is disposed on the distal side of the motor 106. However, this orientation may be reversed. The radial body of the motor 106 as illustrated in FIG. 1 is fixedly attached to a radial casing of the gearbox 108 while the output shaft of the motor 106 is connected to the internal components of the gearbox 108. The radial casing of the gearbox 108 is fixedly attached to a radial frame 147 using mechanical fixtures such as screws 148, 149. The radial frame 147 is fixed to the interior radial surface of the roller tube 112.

The gearbox 108 of the illustrated example includes an output shaft 152 that is driven by the output shaft of the motor 106 via the gears of the gearbox 108. The gears of the gearbox provide the appropriate revolution ratio between the shaft of the motor 106 and the shaft 152 is attached to the shaft coupling 102, which is attached to an output of the clutch/mount 116. The clutch/mount 116 is coupled with the manual control 104.

The example clutch/mount 116 of FIG. 1 includes hooks 162, 164 that are insertable into openings 156, 158 of a bracket 154. The hooks 162, 164 enable the covering 100 to be secured to the bracket 154 via the openings 156, 158. The bracket 154 of the illustrated example is secured in or adjacent to an architectural opening using a mechanical fixture such as a screw 160. The hook and bracket mounting is provided by way of example and other systems for mounting the roller blind 100 may be used.

When the motor 106 of the illustrated example is operated and the manual control 104 is not operated, the clutch/mount 116 holds the shaft coupling 102, the output shaft 152 of the gearbox 108, and, thereby, the output shaft of the motor 106 stationary with respect to the bracket 154. Accordingly, the radial body of the motor 106 rotates with respect to the bracket 154 when the motor 106 is operated. The rotation of the radial body of the motor 106 causes the gearbox 108, the frame 147, and the roller tube 112 to rotate. Accordingly, the roller tube 112 will wind or unwind the covering material when the motor 106 is operated.

When the manual control 104 of the illustrated example is operated and the motor 106 is not operated, the output shaft of the motor 106 is prevented from rotating by a brake included in the motor 106. Alternatively, the gearbox 108 may include a brake or other components may be provided to prevent the output shaft of the motor 106 from rotating with respect to the radial body of the motor 106. The operation of the manual control 104 (e.g., by pulling a continuous cord loop) causes the clutch/mount 116 to impart rotation on the shaft coupling 102. The rotation of the shaft coupling 102 causes the output shaft 152 of the gearbox 108 to rotate. Because the output shaft of the motor 106 is fixed with respect to the radial body of the motor 106, the rotation of the output shaft 152 of the gearbox 108 causes the radial casing of the gearbox 108 and the radial body of the motor 106 to rotate. The rotation of the radial body of the motor 106 causes the frame 147 and the roller tube 112 to rotate. Accordingly, the roller tube 112 will wind or unwind the covering material when the manual control 210 is operated.

When the manual control 104 and the motor 106 are operated simultaneously, their operation is additive. When both the manual control 104 and the motor 106 are operated to wind the roller blind 100, the roller blind 100 is wound at an increased rate. When both the manual control 104 and the motor 106 are operated to unwind the roller blind 100, the roller blind 100 is unwound at an increased rate. When the manual control 104 and the motor 106 are operated in opposite directions, the roller blind 100 is more slowly wound or unwound depending on the relative movement of the manual control 104 and the motor 106.

Because the example motor uses torque detection to determine when the winding or unwinding limits have been reached, operation of the manual control 104 does not interfere with the motorized control of the roller blind 100. In other words, according to the illustrated example, calibration or resetting of limit positions is not necessary after operation of the manual control 104. In implementations where mechanical or electronic limiter switches are used in place of the torque detection, the limiter switches may not need to be calibrated or reset after operation of the manual control 104 where the operation of the operation of the manual control 104 is detected by the limiter switches. For example, when a screw (e.g., the screw of a mechanical limiter switch system is advanced when the manual control 104 is operated, the limiter switch system will not need to be calibrated after operation by the manual control 104.

In the illustrated example of FIG. 1, the body of the motor 106 rotates while the output shaft of the motor 106 is stationary. The body of the motor 106 of the illustrated example includes winding coils (typically called the stator) while the output shaft includes a rod and magnet(s) (typically known as the rotor). Other types of motors may be used.

Figure 2:
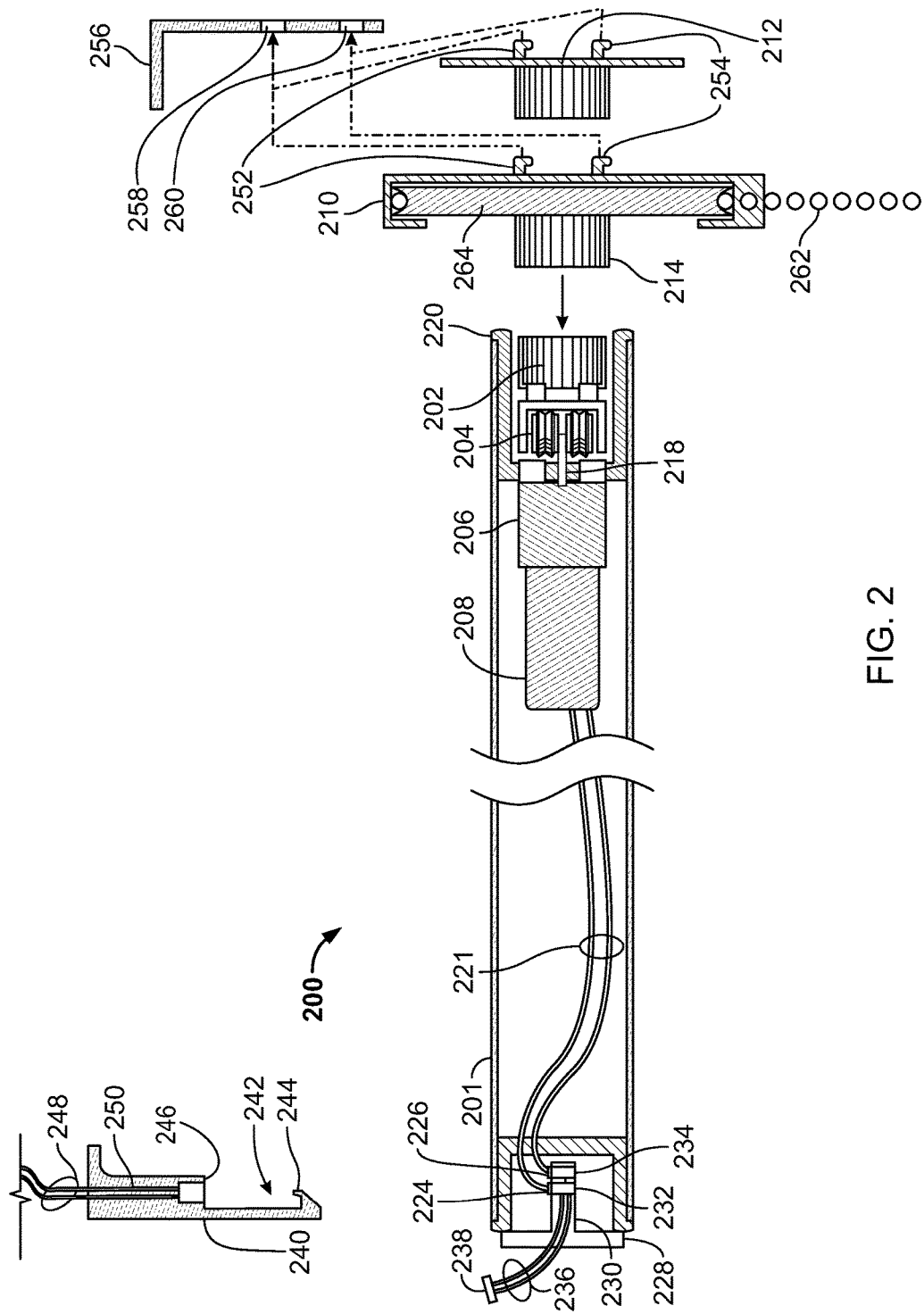
FIG. 2 illustrates an example implementation of a roller type architectural opening covering with a one-way slip clutch to provide a torque limiting motor coupling.

FIG. 2 illustrates an example covering 200 that includes a roller tube 201 containing a grooved hub 202, a one-way slip clutch 204, a gearbox 206, and a motor 208. As will be explained in further detail, the one-way slip clutch 204 is a torque limiting motor coupling that enables the covering 200 to be operated without the need for electronic or mechanical limiter switches. The covering 200 can be mounted with a manual control 210 that allows for manual winding or unwinding of covering material (not illustrated) attached to the roller tube 201. Alternatively, the covering 200 is mounted with a stationary connector 212.

The grooved hub 202 includes grooves to receive splines of a radial protrusion 214 of the manual control 210 or splines of a radial protrusion 216 of the stationary connector 212. A distal side of the grooved hub 202 is fixed to the rotation of the one-way slip clutch 204 by a tang. Accordingly, rotation of the grooved hub 202 applies rotational torque to the one-way slip clutch 204.

The one-way slip clutch 204 of the illustrated example includes an adapter shaft to receive a drive shaft 218 of the gearbox 206. The adapter shaft is similar to the adapter shaft 90 described in conjunction with FIG. 5. A proximate end of the casing of the gearbox 206 is fixed to a frame 220 that is fixed to an interior surface of the roller tube 201. Accordingly, when the casing of the gearbox 206 is rotated, the frame 220 causes rotation of the roller tube 201.

A distal end of the casing of the gearbox is fixed to a casing of the motor 208. The gearbox of the illustrated example includes an adapter shaft to receive a drive shaft of the motor 208. The drive shaft of motor 208 rotatably drives gears of the gearbox 206 to, in turn, rotatably drive the drive shaft 218 of the gearbox 206.

The one-way slip clutch 204 prevents torque from being applied to the roller tube 201 of the illustrated example in the unwinding direction. Additionally, the one-way slip clutch 204 prevents torque exceeding a threshold from being applied to the roller tube 201 in the winding direction.

The covering 200 includes wires 208 having a proximate end fixed to a distal end of the motor 208. A distal end of the wires 208 are fixed to a slip-ring connector 222. The slip-ring connector 222 of the illustrated example includes a first contact 224 and a second contact 226. The slip-ring connector 222 receives an adapter 228 having a post 230 that includes a first conductive ring 232 and a second conductive ring 234. The adapter 228 includes wires 236 including one or more plug(s) 238. The adapter 228 (e.g., a conical cover, an end cap, a plug, etc.) can be releasably mounted in a cavity 242 formed by a first edge 244 and a second edge 246 of a bracket 240. The bracket 240 can be secured in and or adjacent to an architectural opening. Supply wires 248 are connected to an electrical supply (e.g., a source of commercial power) and include one or more receptacle(s) 250 to receive the one or more plug(s) 238. The supply wires 248, wires 236, and wires 221 may be replaced by a combination of wires and one or more batteries to provide electrical power to the roller blind 200.

When the roller tube 201 is rotated, the slip-ring connector 222 including the first contact 224 and the second contact 226 is rotated. The first contact 224 and the second contact 226 are deformable to allow the first contact 224 to remain in contact with the first conductive ring 232 and the second contact 226 to remain in contact with the second conductive ring 234. The adapter 228 remains stationary in the bracket 240 when the roller tube 201 is rotated. Any other type of slip-ring or other type of connection may alternatively be used.

The manual control 210 and the stationary connector 212 of the illustrated example include hooks 252, 254 that are receivable by cavities 258, 260 of a bracket 256 to mount the manual control 210 and/or the stationary connector 212 in and/or adjacent to an architectural opening to which the bracket 256 is secured.

The manual control 210 of the illustrated example includes a beaded chain 262 to drive a pulley 264. The pulley 264 is attached to the radial protrusion 214 via a clutch. The clutch prevents the radial protrusion from rotating when the pulley 264 is not being rotated by the beaded chain 262. Other types of manual controls may be used such as, for example, a rope and pulley, a worm gear control, etc. Any type of mechanical or electronic clutch may be used.

Turning to the operation of the covering 200, when the motor 208 is operated and the manual control 210 is not operated, the clutch of the manual control 210 holds the radial protrusion 214, the grooved hub 202, the drive shaft 218 of the gearbox 206, and, thereby, the output shaft of the motor 208 stationary with respect to the bracket 256. Accordingly, the casing of the motor 208 rotates with respect to the bracket 256 when the motor 208 is operated. The rotation of the casing of the motor 208 causes the casing of the gearbox 206, the frame 220, and the roller tube 201 to rotate. Accordingly, the roller tube 201 will wind or unwind covering material when the motor 208 is operated.

When the manual control 210 is operated and the motor 208 is not operated, the output shaft of the motor 208 is prevented from rotating by a brake included in the motor 208. Alternatively, the gearbox 206 may include a brake or other components may be provided to prevent the output shaft of the motor 208 from rotating with respect to the casing of the motor 208 when the manual control 210 is operated. The operation of the manual control 210 (e.g., by pulling the beaded chain 262) causes the pulley 264 to impart rotation on the radial protrusion 214. The rotation of the radial protrusion 214 causes the grooved hub 202, the drive shaft 218 of the gearbox 206, and the drive shaft of the motor 208 to rotate. Because the drive shaft of the motor 208 is fixed with respect to the casing of the motor 208, the rotation of the drive shaft 218 of the gearbox 206 causes the casing of the gearbox 206 and the casing of the motor 208 to rotate. The rotation of the casing of the gearbox 206 causes the frame 220 and the roller tube 201 to rotate. Accordingly, the roller tube 201 will wind or unwind covering material when the manual control 210 is operated.

When the manual control 210 and the motor 208 are operated simultaneously, their operation is additive. When both the manual control 210 and the motor 208 are operated to wind the covering 200, the material around the roller tube 201 is wound at an increased rate. When both the manual control 210 and the motor 208 are operated to unwind the covering 200, the material around the roller tube 201 is unwound at an increased rate. When the manual control 210 and the motor 208 are operated in opposite directions, the covering 200 is more slowly wound or unwound.

In the example of FIG. 2, the casing of the motor 208 rotates while the drive shaft of the motor 208 is stationary. The casing of the motor 208 of the illustrated example includes winding coils (typically called the stator) while the output shaft includes a rod and magnet(s) (typically known as the rotor). Other types of motors may be used.

Figure 19:
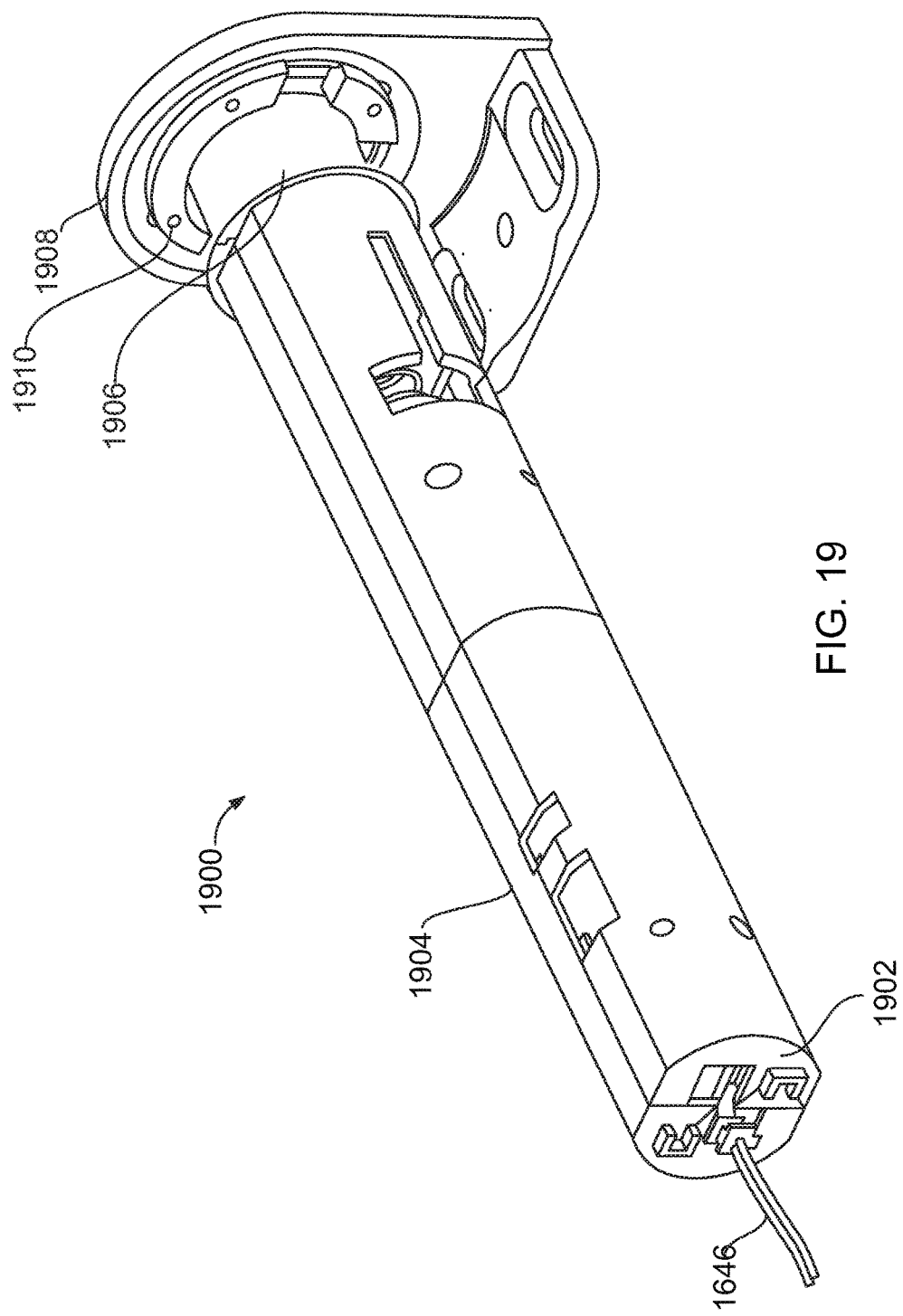
FIG. 19 is a perspective view of an example local controller of the example architectural opening covering assembly of FIG. 9.

Flowcharts representative of example machine readable instructions for implementing a controller of, for example, the control board 120 of FIG. 1, the control board 1900 of FIG. 19, or any other controller is shown in FIGS. 3-6. In these examples, the machine readable instructions comprise a program for execution by a processing system such as the processing system 2200 discussed in connection with FIG. 22. The program may be embodied in software stored on a tangible computer readable medium such as a CD-ROM, a floppy disk, a hard drive, a digital versatile disk (DVD), a Blu-ray disk, or a memory associated with the processor 2212, but the entire program and/or parts thereof could alternatively be executed by a device other than the processor 2212 and/or embodied in firmware or dedicated hardware. Further, although the example program is described with reference to the flowcharts illustrated in FIGS. 3-6, many other methods of implementing a controller may alternatively be used. For example, the order of execution of the blocks may be changed, and/or some of the blocks described may be changed, eliminated, or combined.

As mentioned above, the example processes of FIGS. 3-6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 3-6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 3:
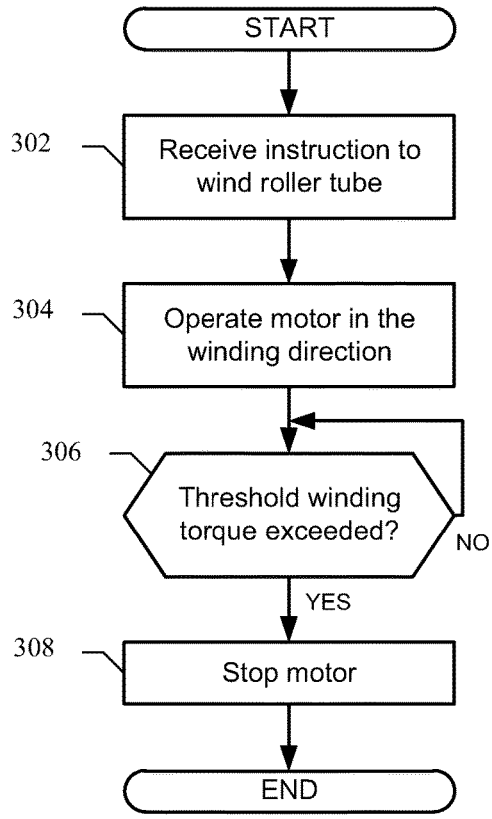
FIGS. 3-6 are flowcharts illustrating example methods to control operation of a roller type architectural opening covering.

FIG. 3 is a flowchart illustrating example method to control operation of a roller type architectural opening covering. The example method of FIG. 3 is described in conjunction with the covering 100 of FIG. 1. However, the example method may be used with any other covering (e.g., the covering 200 of FIG. 2).

The example instructions of FIG. 3 begin when the control board 110 receives an instruction to wind the roller tube 112 (block 302). For example, the control board 110 may receive an instruction from a wireless remote control via a wireless receiver included in the control board 110, from a wired remote control, from a button on a control panel, etc. In response to the instruction, the control board 110 operates the motor 106 in a winding direction (e.g., to raise covering material attached to the roller tube 112) (block 304). As previously described, the clutch/mount 116 prevents rotation of the output shaft of the motor 106. Accordingly, the radial body of the motor 106, the radial casing of the gearbox 108, the frame 147, and the roller tube 112 are rotated. The control board 110 determines if the torque on the motor exceeds a winding torque threshold (block 306). For example, when the covering 100 is wound to its upper-most limit, a bottom bar or weight attached to the covering material will reach a frame of the covering 100 and prevent rotation of the roller tube 100 around which the covering material is wrapped. This stoppage will cause the torque on the motor to increase beyond a threshold. The threshold can be selected so that normal winding (e.g., when no obstruction is present) does not exceed the torque threshold, but winding against a frame or obstruction will cause the threshold to be passed.

If the winding torque threshold has not been exceeded (block 306), the motor 106 continues to operate until the threshold is exceeded. If the winding torque threshold has been exceeded (block 306), the motor is stopped (block 308). For example, when the covering 100 is fully wound or an obstruction preventing winding is encountered, the motor 100 will be stopped. The method of FIG. 3 then ends until a new instruction is received at the control board 110.

Figure 4:
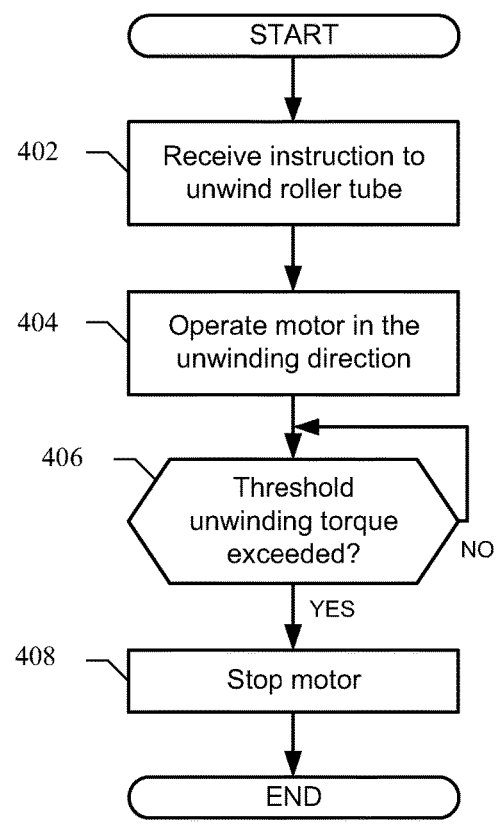

The example instructions of FIG. 4 begin when the control board 110 receives an instruction to unwind the roller tube 112 (block 402). In response to the instruction, the control board 110 operates the motor 106 in an unwinding direction (e.g., to lower covering material attached to the roller tube 112) (block 404). As previously described, the clutch/mount 116 prevents rotation of the output shaft of the motor 106. Accordingly, the radial body of the motor 106, the radial casing of the gearbox 108, the frame 147, and the roller tube 112 are rotated. The control board 110 determines if the torque on the motor exceeds an unwinding torque threshold (block 406). For example, when the covering 100 is unwound to its lower-most limit, the covering material may begin to wind on the roller (e.g., raising the covering material). This winding will increase the torque on the motor (e.g., to levels similar to the levels found when operating the covering 100 in winding). Thus, the threshold can be selected so that normal unwinding does not exceed the torque threshold, but winding the covering material (e.g., after fully unwinding the covering material) will cause the threshold to be passed. According to the illustrated example, the winding threshold exceeds the unwinding threshold so that end-of-material winding can be detected.

If the unwinding torque threshold has not been exceeded (block 406), the motor 106 continues to operate until the threshold is exceeded. If the unwinding torque threshold has been exceeded (block 406), the motor is stopped (block 408). For example, when the covering 100 is fully unwound and starts to wind, the motor 100 will be stopped. The method of FIG. 4 then ends until a new instruction is received at the control board 110.

Figure 5:
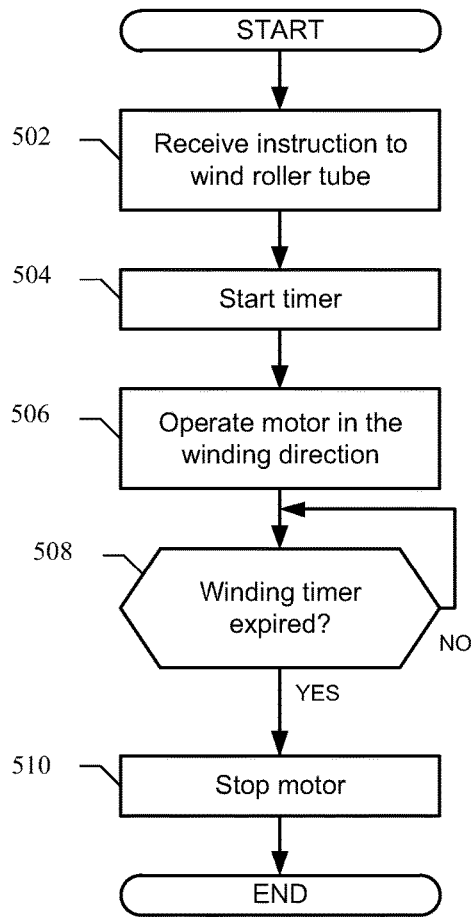

FIG. 5 is a flowchart illustrating example instructions to control operation of a roller type architectural opening covering. The example of FIG. 5 is described in conjunction with the covering 200 of FIG. 2. However, the example method may be used with any other covering (e.g., the covering 100 of FIG. 1).

The example of FIG. 5 begins when a controller (e.g., a controller of the controller board 110 of FIG. 1 receives an instruction to wind the roller tube 201 (block 502). For example, the controller may receive an instruction from a wireless remote control via a wireless receiver included in the controller, from a wired remote control, from a button on a control panel, etc. In response to the instruction, the controller starts a timer (block 504). For example, the timer may be set for a duration that is long enough for the covering 200 to be wound from its lower-most position to its upper-most position. The timer may additionally include an additional time to account for short delays in winding (e.g., a short amount of time during which the covering 200 is obstructed). Then, the controller operates the motor 208 in a winding direction (e.g., to raise covering material attached to the roller tube 201) (block 506). As previously described, a clutch of the manual control 210 or the stationary connector 212 prevents rotation of the drive shaft of the motor 208. Accordingly, the casing of the motor 208, the casing of the gearbox 206, the frame 220, and the roller tube 201 are rotated.

The controller then determines if the winding timer has expired (i.e., the winding time limit has been reached) (block 508). For example, the covering 200 may have been wound from its lower-most position to its upper-most position. Alternatively, the covering 200 may have been wound from an intermediate position to its upper-most position. In such an operation, the motor 208 would continue to run when the covering 200 reaches its upper most position while the one-way slip clutch 204 slipped to prevent excessive torque from being applied to the roller tube 201 until the timer expired. In another instance, the covering 200 may encounter an obstruction that prevents fully winding the covering material. In such an operation, the motor 208 would continue to run while the one-way slip clutch 204 slipped to prevent excessive torque from being applied to the roller tube 201 until the timer expired.

If the winding timer has not expired (block 508), the motor 208 continues to operate until the timer expires. If the winding timer has expired (block 508), the motor is stopped (block 510). The method of FIG. 5 then ends until a new instruction is received at the controller.

Figure 6:
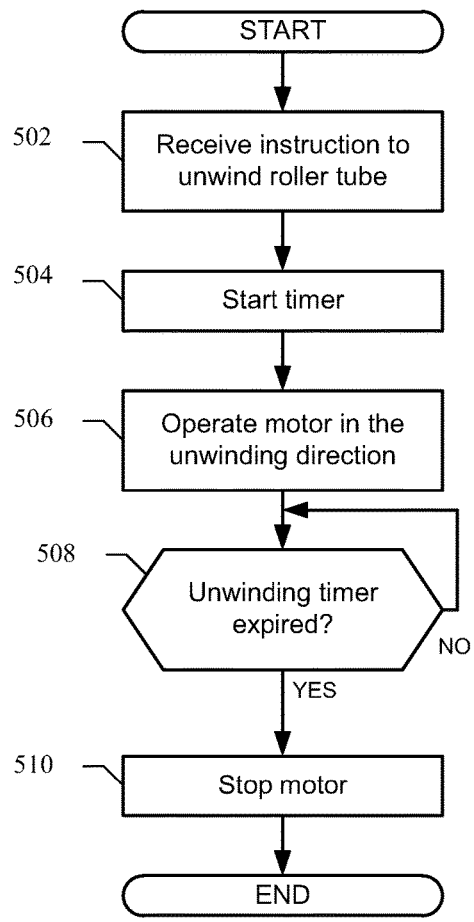

FIG. 6 is a flowchart illustrating example instructions to control operation of a roller type architectural opening covering. The example of FIG. 6 is described in conjunction with the covering 200 of FIG. 2. However, the example method may be used with any other covering (e.g., the covering 100 of FIG. 1).

The example of FIG. 6 begins when a controller (not illustrated) receives an instruction to unwind the roller tube 201 (block 602). For example, the controller may receive an instruction from a wireless remote control via a wireless receiver included in the controller, from a wired remote control, from a button on a control panel, etc. In response to the instruction, the controller starts a timer (block 604). For example, the timer may be set for a duration that is long enough for the covering 200 to be unwound from its upper-most position to its lower-most position. The timer may additionally include an additional time to account for short delays in unwinding (e.g., a short amount of time during which the covering 200 is obstructed). Then, the controller operates the motor 208 in an unwinding direction (e.g., to lower covering material attached to the roller tube 201) (block 606). As previously described, a clutch of the manual control 210 or the stationary connector 212 prevents rotation of the drive shaft of the motor 208. Accordingly, the casing of the motor 208, the casing of the gearbox 206, the frame 220, and the roller tube 201 are rotated because the motor 208 no longer opposes unwinding of the covering 200 (e.g., where a weight attached to covering material of the covering 200 creates a torque to pull the covering material).

The controller then determines if the unwinding timer has expired (i.e., the unwinding time limit has been reached) (block 608). For example, the covering 200 may have been unwound from its upper-most position to its lower-most position. Alternatively, the covering 200 may have been unwound from an intermediate position to its lower-most position. In such an operation, the motor 208 would continue to run when the covering 200 reaches its lower-most position while the one-way slip clutch 204 prevented torque from being applied to the roller tube 201 until the timer expired. In another instance, the covering 200 may encounter an obstruction that prevents fully unwinding the covering material. In such an operation, the motor 208 would continue to run while the one-way slip clutch 204 slipped to prevent excessive torque from being applied to the roller tube 201 until the timer expired.

If the unwinding timer has not expired (block 608), the motor 208 continues to operate until the timer expires. If the unwinding timer has expired (block 608), the motor is stopped (block 610). The method of FIG. 6 then ends until a new instruction is received at the controller.

Figure 7:
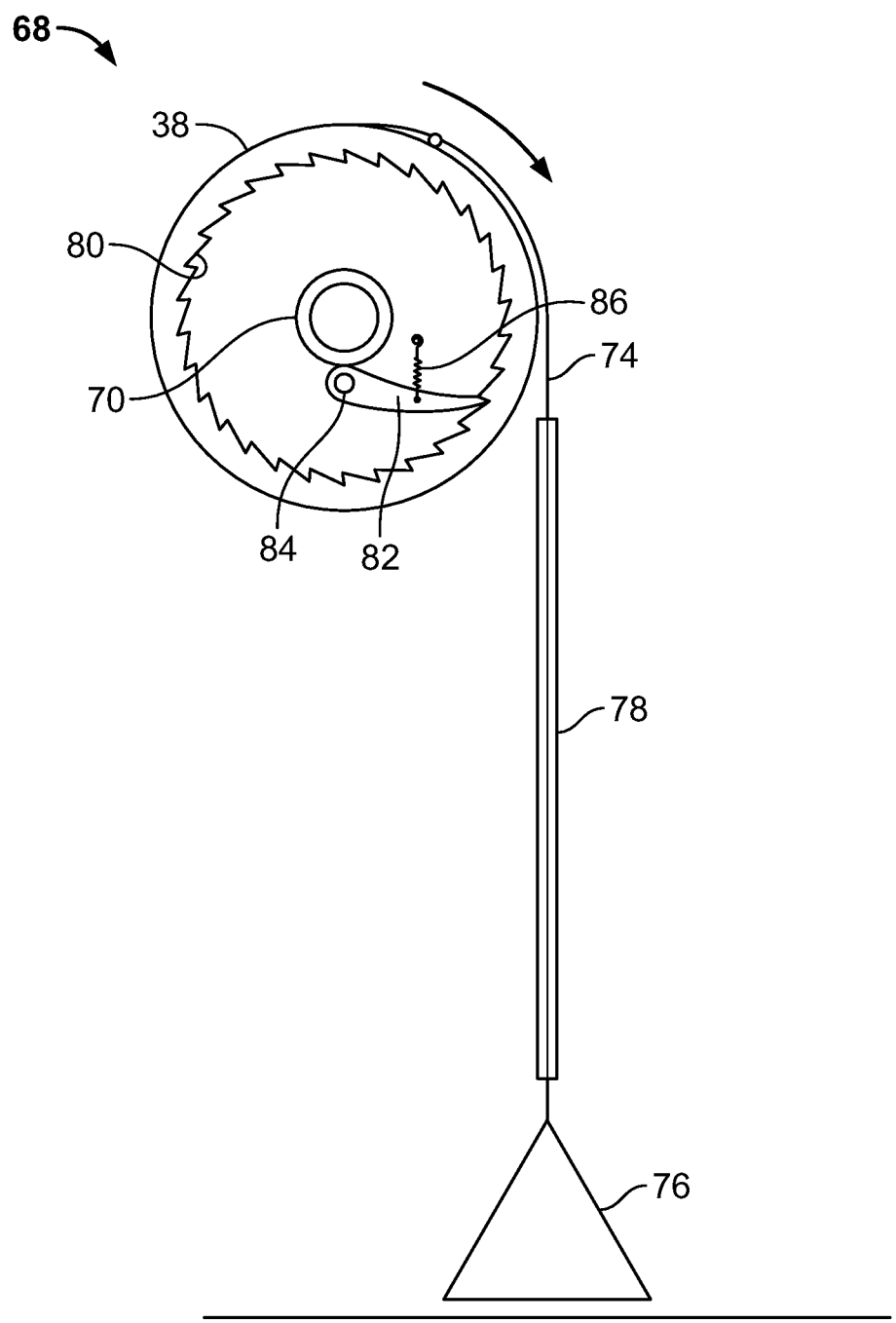
FIG. 7 illustrates a torque limiting motor configuration.

FIG. 7 illustrates an example torque limiting motor coupling 68 that prevents a motor from applying torque to a roller tube 38 in an unwinding direction. The example configuration of FIG. 7 includes, for example, a motor output shaft coupling 70 positioned on a motor shaft (not labeled). A roller tube 38 is illustrated as an outer diameter of the system, which is connected to the fabric 74 and, in turn, the weighted rail 76. A track 78 is also illustrated which guides the fabric 74 during winding and unwinding operations.

The motor output shaft coupling 70 functions as a ratchet crank, where ratchet gear teeth 80 are part of the inner diameter 36 of the roller tube 38 or are fitted thereto by an additional adaptor (not illustrated). A pawl 82 is connected to the motor output shaft coupling 70 by a pivot 84 and a compression spring 86.

While the motor shaft is unwinding the fabric 74, the pawl 82, locked against the gear teeth 80, prevents an uncontrolled unwind which could otherwise occur from the weight of the bottom rail 76. Similarly, when the motor shaft ceases unwinding or winds in the take-up direction, the motor output shaft coupling 70, with the pawl 82 locked against the gear teeth 80, enables winding of the roller tube 38 so as to raise the bottom rail 76 and retract the fabric 74 about the roller tube 38. In other words, the torque applied by this motor configuration, whether during an unwinding or winding operation, is in the winding direction.

While unwinding, should the roller tube become obstructed, for example, due to debris, the motor shaft 38 would still turn. However, the pawl 82 and the gear 80, slipping relative to each other, would be unable to apply torque in the unwinding direction.

If an obstruction is in the track, a similar outcome is achieved. When the rail 76 comes to rest on the obstruction, and the fabric 74 has bunched up in the track 78, the motor shaft 38 would still turn. Again, however, the pawl 82 and gear 80, slipping relative to each other, would be unable to apply torque in the unwinding direction. Without the application of torque in the unwinding direction, the fabric, with its weight supported by the obstruction, will not continue to unwind from the roller tube 38.

Figure 8:
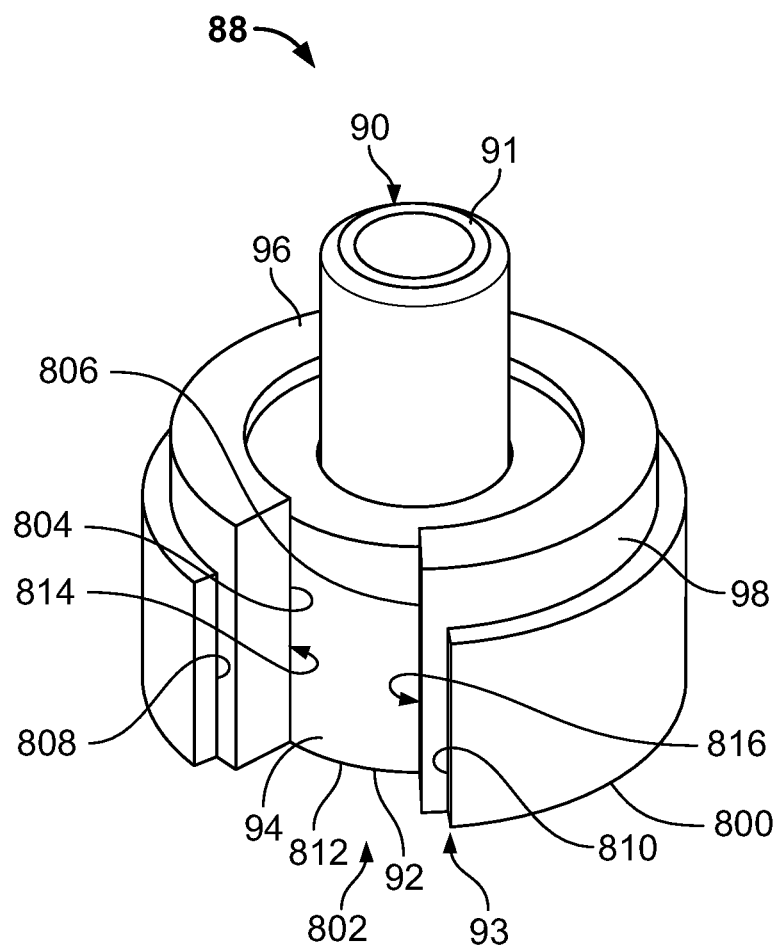
FIG. 8 illustrates a torque limiting motor coupling.

FIG. 8 illustrates an example implementation of a torque limiting motor coupling 88, which will now be discussed. As with the torque limiting motor coupling 68, the torque limiting motor coupling 88 is unable to apply torque in the unwinding direction. Furthermore, the torque limiting motor coupling 88 also slips against a roller tube upon being subjected to opposing torque at a threshold level in a winding direction.

The motor coupling 88 includes an adaptor shaft 90, which is a keyed cylinder, adapted to fit outside of the distal end of a shaft of a motor. Surrounding the adaptor shaft 90, centered between opposing proximate end 91 and distal end, 93 of the adaptor shaft 90, is a one-way bearing 92.

Functionally, the one-way bearing 92 is analogous to the ratchet-pawl configuration of the torque limiting motor coupling 68. That is, due to the one-way rolling of the outer bearing race with respect to the adaptor shaft 90, an attached motor is unable to apply torque in the unwinding direction.

A difference between the torque limiting motor coupling 88 and the ratchet-pawl configuration 68 is, for example, the bearing is quieter than a ratchet-pawl configuration. Furthermore, the torque limiting motor coupling 88 does not require a pivotable pawl 82 and also does not require a mating gear structure 80 in the roller tube 38.

On the outer race 94 of the bearing 92, a slip-clutch 96 is provided. The slip-clutch 96 is designed to slip against the bearing 92. Holding the slip-clutch 96 in place, on its radial outer surface 98, is a spring 800. The selection of the spring 800 (e.g., the spring force of the spring) defines the threshold torque required to slip the slip-clutch 96 against the bearing 92. The slip-clutch 96 is not illustrated in FIG. 7; however, it can be integrated into that configuration as well.

In the example torque limiting motor coupling 88 of, for example, FIG. 8, the bearing 92, the slip-clutch 96 and the spring 800 are axially centered relative to each other and have substantially the same axial dimension. The example shaft 90 is longer than the bearing 92, the slip-clutch 96 and the spring 800. Among other things, this provides the proximate end 91 and the distal shaft end 93 with a small amount of material for spacing the bearing 92, the slip-clutch 96 and the spring 800 from the axial base of the adapter shaft 90.

The axial buffer zone on both sides of the torque limiting motor coupling 88 enables reversing the torque limiting motor coupling 88 depending on whether a motor is placed on the left or right hand side within a roller tube, due to, for example, the location of available wiring. Reversing the torque limiting motor coupling 88 is achieved by sliding the adaptor shaft 90 off of a motor shaft and reinstalling the adaptor shaft 90 so that the distal end 93 of the adaptor shaft 90, rather than the proximate end 91, faces a distal end of an attached motor.

An example cavity 802 is defined between opposing, circumferentially spaced edges 804, 806 of the slip-clutch 96 and edges 808, 810 of the spring 800, rendering the slip-clutch 96 and spring 800 "C" shaped. Specifically, a base 812 of the cavity 802 is the outer race 94 of the bearing 92. A first side 814 of the cavity 802 is defined by aligned edges 804, 808 of the slip-clutch 96 and the spring 800. A second side 816 of the cavity 802 is defined by aligned edges 806, 810 of the slip-clutch 96 and the spring 800.

The example cavity 802 may be mated with a tang manufactured in a modified crown coupling. An example tang has a radial inner surface which does not reach the bearing 92. The tang moves circumferentially between opposing sides 814, 816 of the cavity 802 so that one of the tang surfaces presses against a respective one of the sides 814, 816 of the cavity 802, whereby the tang rotates with the slip-clutch 96. Thus, the modified crown coupling is capable of rotating with an attached motor shaft.

Depending on the direction the tang moves in the cavity 802, the bearing 92 will either roll or lock. If locked, the slip-clutch 96 will slip when torque at the threshold limit is applied. Accordingly, if a covering is obstructed during a winding operation, the slip-clutch 96 slips when the torque of the motor reaches a threshold limit. The motor shaft then spins, without spinning the roller tube 38 as long as torque above this threshold limit is maintained, preventing overstraining of the motor or the fabric of the covering.

The slip-clutch 96 configuration should be selected so that slip occurs at a greater torque than required to wind the fabric. On the other hand, the configuration should be selected so that slip occurs at a lower torque than required to strain the motor.

As an alternative to the slip-clutch 96, a motor can be equipped with an overload system including one or more sensors. For example, a mechanical torque based sensor and/or an electrical current (e.g., amperage) based sensor (not illustrated) may be used. This type of system would shut off the motor 18 after mechanically sensing torque which exceeds a threshold and/or sensing a current draw which exceeds a threshold.

Figure 9:
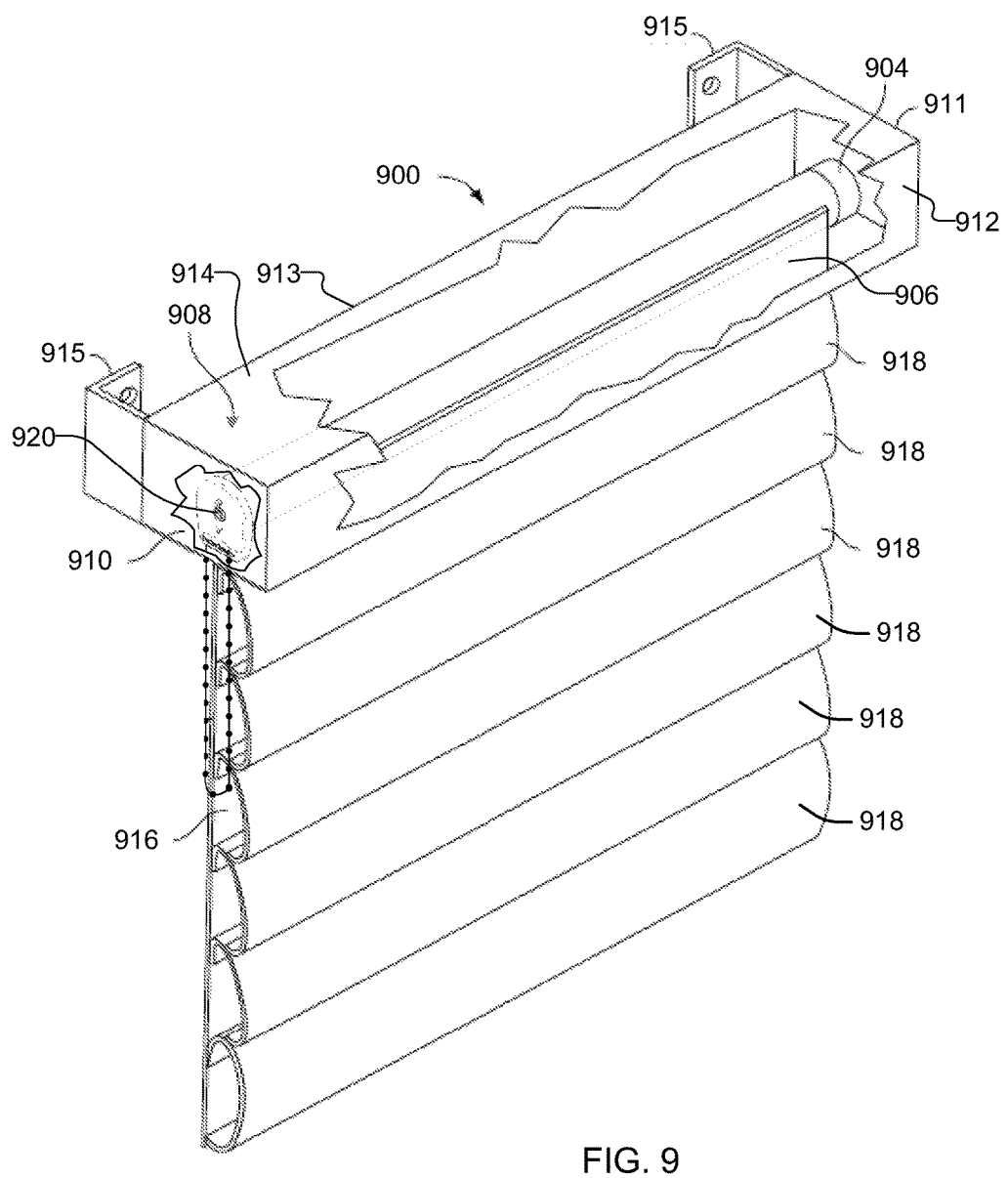
FIG. 9 is an isometric illustration of an example architectural opening covering assembly including an example manual controller.

FIG. 9 is an isometric illustration of an example architectural opening covering assembly 900. In the example of FIG. 9, the covering assembly 900 includes a headrail 908. The headrail 908 is a housing having opposed end caps 910, 911 joined by front 912, back 913 and top sides 914 to form an open bottom enclosure. The headrail 908 also has mounts 915 for coupling the headrail 908 to a structure above an architectural opening such as a wall via mechanical fasteners such as screws, bolts, etc. A roller tube 904 is disposed between the end caps 910, 911. Although a particular example of a headrail 908 is shown in FIG. 9, many different types and styles of headrails exist and could be employed in place of the example headrail 908 of FIG. 9. Indeed, if the aesthetic effect of the headrail 908 is not desired, it can be eliminated in favor of mounting brackets.

In the example illustrated in FIG. 9, the assembly 900 includes a covering 906, which is a cellular type of shade. In this example, the cellular covering 906 includes a unitary flexible fabric (referred to herein as a "backplane") 916 and a plurality of cell sheets 918 that are secured to the backplane 916 to form a series of cells. The cell sheets 918 may be secured to the backplane 916 using any desired fastening approach such as adhesive attachment, sonic welding, weaving, stitching, etc. The covering 906 shown in FIG. 9 can be replaced by any other type of covering including, for instance, single sheet shades, blinds, and/or other cellular coverings. In the illustrated example, the covering 906 has an upper edge mounted to the roller tube 904 and a lower, free edge. The upper edge of the example covering 906 is coupled to the roller tube 904 via a chemical fastener (e.g., glue) and/or one or more mechanical fasteners (e.g., rivets, tape, staples, tacks, etc.). The covering 906 is movable between a raised position and a lowered position (illustratively, the position shown in FIG. 9). When in the raised position, the covering 906 is wound about the roller tube 904.

As discussed in detail below, the example architectural opening covering assembly 900 is provided with a powered motor to move the covering 906 between the raised and lowered positions. The powered motor is controlled by a local controller, a local controller in communication with a central controller, and/or only a central controller. In the illustrated example, the motor and the local controller are disposed inside the tube 904. The example assembly 900 of FIG. 9 further includes a manual controller 920 that may be used to manually override commands provided by the central controller and/or the local controller, and/or may be used to move the covering 906 between the raised and lowered positions.

Figure 10:
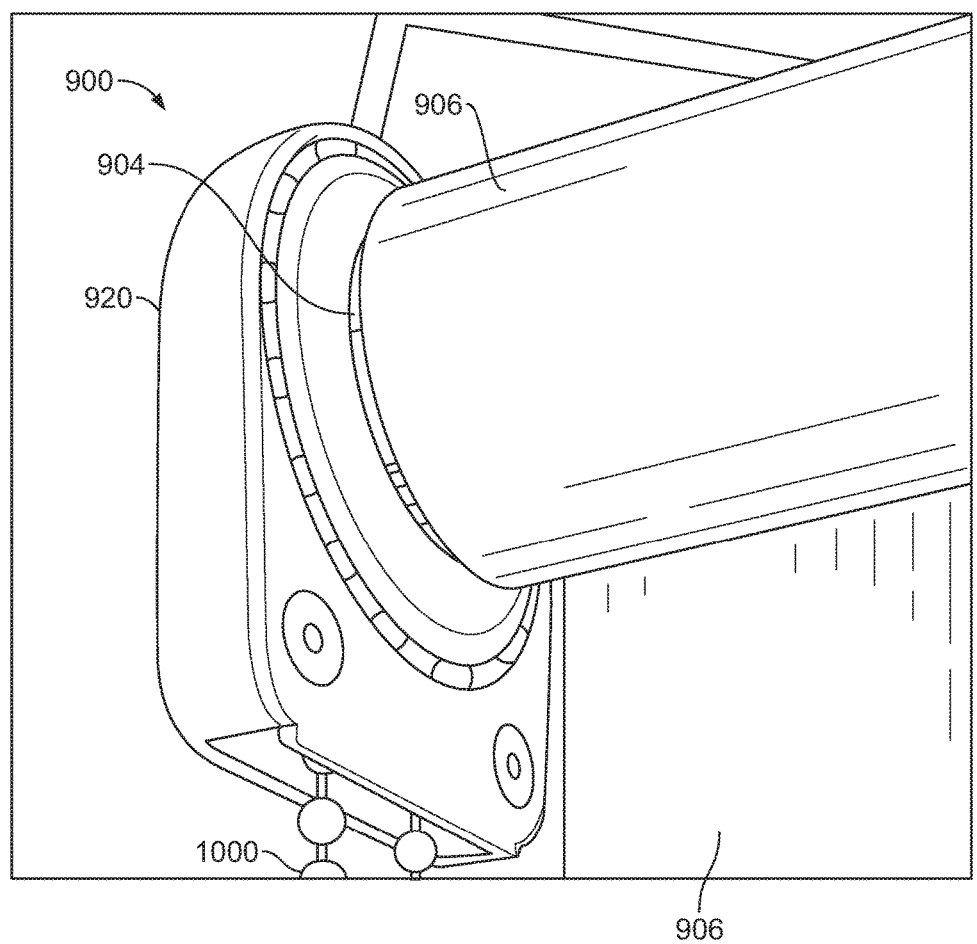
FIG. 10 is an enlarged view illustrating the manual controller of the example architectural opening covering assembly of FIG. 9.

FIG. 10 illustrates the roller tube 904 of the assembly 900 coupled to the manual controller 920. In the illustrated example, the manual controller 920 includes a cord 1000. In some instances, the cord 1000 may be a chain, a beaded chain, a rotatable rod, a crank, a lever, and/or any other suitable device. As described in greater detail below, when the cord 1000 is actuated (e.g., pulled with sufficient force), the manual controller 920 rotates the tube 904, thereby enabling a user to selectively raise or lower the covering 906 via the manual controller 920.

Figure 11:
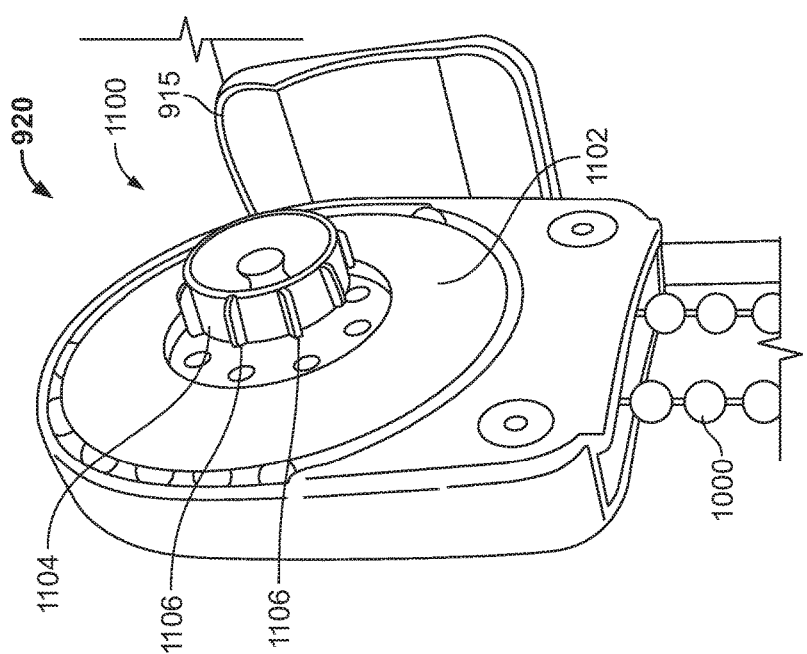
FIG. 11 is a perspective view of the example manual controller of the example architectural opening covering assembly of FIG. 9.

FIG. 11 is a perspective view of the example manual controller 920 of FIG. 9 with the tube 904 removed. In the illustrated example, the headrail 908 is also removed. The example manual controller 920 is coupled to one of the mounts 915. The manual controller 920 includes a male connector 1100, which includes a plate 1102 and a shaft 1104 extending from the plate 1102. The example shaft of FIG. 11 includes plurality of splines 1106. As described in greater detail below, the shaft 1104 of the male connector 1100 is coupled to a clutch assembly disposed inside the tube 904.

Figure 12:
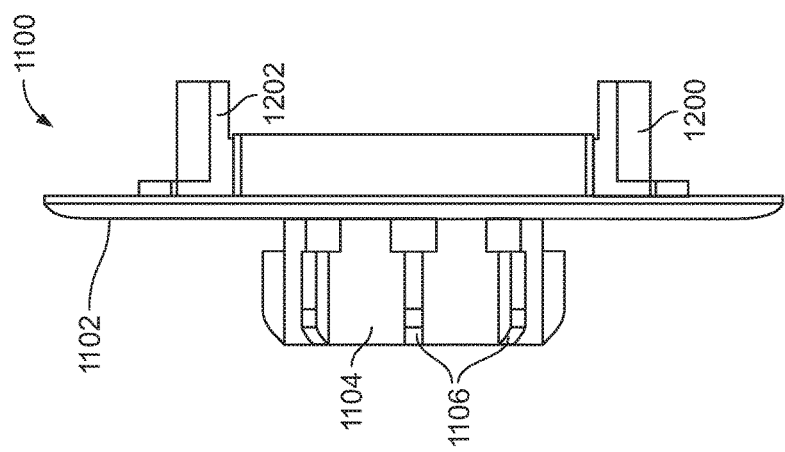
FIG. 12 is a side view of an example male connector of the example manual controller of FIG. 11.

FIG. 12 is a side view of the example male connector 1100 of FIG. 11. The example male connector 1100 includes a first arm 1200 and a second arm 1202, each of which extends from the plate 1102 into the manual controller 920. As described in greater detail below, the example manual controller 920 of FIG. 11 restricts movement of the male connector 1100 unless the cord 1000 is moving.

Figure 13:
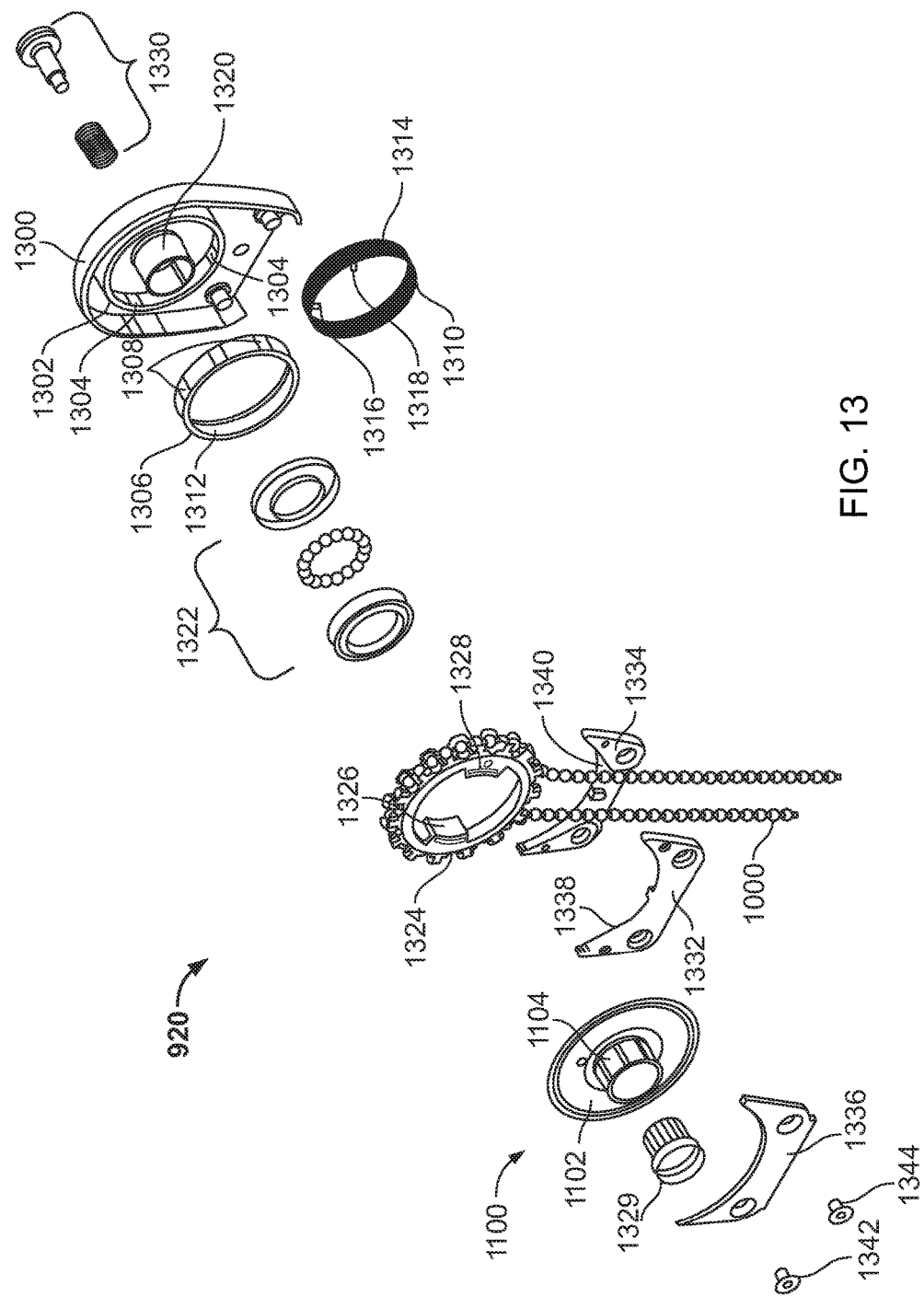
FIG. 13 is an exploded view of the example manual controller of FIG. 11.

FIG. 13 is an exploded view of the example manual controller 920 of FIG. 11. In the illustrated example, the manual controller 920 includes a housing 1300 defining an annular ridge 1302, which includes a plurality of grooves 1304. A ring 1306 defining a plurality of splines 1308 is disposed in the space defined by the annular ridge 1302. The grooves 1304 of the ridge 1302 receive the splines 1308 of the ring 1306 to substantially prevent rotation of the ring 1306 during operation of the manual controller 920. A wrap spring 1310 is disposed adjacent an interior surface 512 of the ring 1306 and oriented substantially concentric to the ring 1306. In the illustrated example, the wrap spring 1310 is tensioned such that an outer surface 514 of the wrap spring 1310 engages the interior surface 512 of the ring 1306. The wrap spring 1310 includes a first tang 1316 and a second tang 1318. The housing 1300 defines a shaft 1320 to receive a bearing 1322 about which the wrap spring 1310, a sprocket 1324 and the male connector 1100 are supported. The example sprocket 1324 of FIG. 13 is operatively coupled to the cord 1000.

The example sprocket 1324 includes a first wing or arm 1326 and a second wing or arm 1328, each of which extends toward the housing 1300 in the orientation of FIG. 13. The arms 1200, 1202 (illustrated in FIG. 12) of the male connector 1100 and the arms 1326, 1328 of the sprocket 1324 are disposed adjacent the tangs 1316, 1318 of the wrap spring 1310. A fitting 1329 (e.g., a plug) operatively couples the male connector 1100 to the housing 1300, and a spring-loaded fastener 1330 (e.g., a spring and a rivet) couples the housing 1300 to one of the mounts 915.

A first cord guide plate 1332 and a second cord guide plate 1334 are coupled to the example housing 1300 via a cover 1336 to define a first channel 1338 and a second channel 1340. In the illustrated example, a first portion of the cord 1000 is disposed in the first channel 1338, and a second portion of the cord 1000 is disposed in the second channel 1340. The example first and second channels 1338, 1340 define first and second paths, respectively, for the cord 1000 to prevent the cord 1000 from disengaging the sprocket 1324 during operation (e.g., when a user pulls the cord 1000). In the illustrated example, a pair of mechanical fasteners 1342, 1344 couple the cover 1336, the first cord guide plate 1332, and the second cord guide plate 1334 to the housing 1300.

When the manual controller 920 is operated via the cord 1000 (e.g., by pulling the cord 1000 with sufficient force), the cord 1000 applies torque to the sprocket 1324. As a result, one of the arms 1326, 1328 of the sprocket 1324 engages one the tangs 1316, 1318 of the wrap spring 1310, thereby causing the wrap spring 1310 to tighten. When the wrap spring 1310 tightens, a diameter of the wrap spring 1310 decreases, and the wrap spring 1310 disengages the inner surface 512 of the ring 1306. As a result, the wrap spring 1310 and, thus, the sprocket 1324 may be rotated by actuating the cord 1000. When the wrap spring 1310 rotates, one of the tangs 1316, 1318 engages one of the arms 1200, 1202 of the male connector 1100, thereby rotating the male connector 1100. As described in greater detail below, the male connector 1100 is operatively coupled to the roller tube 904. Thus, the user may selectively raise or lower the example covering 906 by actuating the cord 1000.

Conversely, if torque is applied to the male connector 1100 via the shaft 1104, one of the arms 1200, 1202 of the male connector 1100 engages one of the tangs 1316, 1318 of the wrap spring 1310, thereby causing the wrap spring 1310 to loosen and, thus, the diameter of the wrap spring 1310 to increase. As a result, the outer surface 514 of the wrap spring 1310 tightly engages the inner surface 512 of the ring 1306. When the wrap spring 1310 engages the ring 1306 with sufficient force, the wrap spring 1310 is held substantially stationary by the interconnection of the ring 1306 to the housing 1300, thereby substantially preventing the male connector 1100 from rotating. Therefore, although a user may rotate the male connector 1100 by actuating the cord 1000, the male connector 1100 is substantially prevented from rotation via torque (e.g., torque applied by a motor) applied to the shaft 1104 of the male connector 1100.

FIG. 14 is perspective view of an example clutch assembly 1400 and an example motor 1402 of the example architectural opening covering assembly 900 of FIG. 9. The example clutch assembly 1400 of FIG. 14 and the example motor 1402 are disposed inside the roller tube 904. The example clutch assembly 1400 includes a frame or housing 1404. In the illustrated example, the frame 1404 is substantially cylindrical and defines one or more grooves or channels 1406, 1408 to receive one or more ridges or protrusions 1500, 1502 (FIG. 15) of the tube 904. The example clutch assembly 1400 is operatively coupled to the example manual controller 920 of FIG. 11 via a female connector or coupling 1410, which receives the male connector 1100 of the manual controller 920. In the illustrated example, the female connector 1410 includes ridges or splines 1418 to engage the splines 1106 of the male connector 1100. As described in greater detail below, when the covering 906 is raised or lowered under the influence of the motor 1402, the male connector 1100 of the manual controller 920 holds the female connector 1410 of the example clutch assembly 1400 substantially stationary to cause the motor 1402 to rotate with the frame 1404.

FIG. 15 is a perspective view of the example tube 904 of the example architectural opening covering assembly 900 of FIG. 9. In the illustrated example, the tube 904 defines a first ridge or protrusion 1500 and a second ridge or protrusion 1502. The first and second protrusions 1500, 1502 extend radially and inwardly (e.g., toward an axis of rotation of the tube 904). When the example clutch assembly 1400 of FIG. 14 is disposed inside the example tube 904, the protrusions 1500, 1502 of the tube 904 are disposed in the slots 1406, 1408 of the frame 1404. During operation of the assembly 900, the motor 1402 and/or the manual controller 920 applies torque to the frame 1404 of the clutch assembly 1400. As a result, the torque applied to the frame 1404 is transferred to the protrusions 1500, 1502 of the tube 904 via the slots 1406, 1408 of the frame 1404, thereby causing the tube 904 to rotate with the frame 1404.

FIGS. 16-18 are cross-sectional views of the example clutch assembly 1400 and the example motor 1402 of FIG. 14. The example clutch assembly 1400 includes a first clutch 1600 and a second clutch 1602. The example first clutch 1600 of FIG. 16 includes the female connector 1410 and a drive shaft 1604. The example female connector 1410 is operatively coupled to a first end 806 of the drive shaft 1604. The example drive shaft 1604 of FIG. 16 includes a collar 1607.

FIG. 17 is a cross-sectional view taken along line 17A-17A of FIG. 16. In the illustrated example, the first clutch 1600 provides a dead band (i.e., a lost motion path) between the female connector 1410 and the drive shaft 1604. In the illustrated example, the example female connector 1410 includes a first spline or tooth 1700 and a second spline or tooth 1702. In the illustrated example, the first and second teeth 1700, 1702 are disposed approximately 180 degrees apart (e.g., the first and second teeth 1700, 1702 are disposed along a diameter of the female connector 1410) along a circumferential surface of the female connector 1410 adjacent and radial to the first end 806 of the drive shaft 1604. The collar 1607 of the example drive shaft 1604 is adjacent the teeth 1700, 1702 of the female connector 1410, and first and second teeth 1704, 1706 extend from the first collar 1607 substantially parallel to a longitudinal axis of the drive shaft 1604. In the illustrated example, the first and second teeth 1704, 1706 are about 180 degrees apart (e.g., along a diameter of the first collar 1607). During operation, when the tube 904 is rotating under the influence of the motor 1402, the teeth 1700, 1702 of the female connector 1410 engage the teeth 1704, 1706 of the first collar 1607 of the drive shaft 1604. As described in greater detail below, when the covering 906 is fully unwound under the influence of the motor 1402, the tooth 1702 separates from the tooth 1706, and the motor 1402 drives the drive shaft 1604 through at least a portion of the dead band. As a result, the drive shaft 1604 rotates relative to the female connector 1410, and the tube 904 stops rotating. As described in further detail herein, the termination of rotation of the tube 904 is detected to identify the fully unwound position.

A portion of the example drive shaft 1604 is supported by a bearing 1608 (e.g., a dry bearing). In the illustrated example, the bearing 1608 is defined by the frame 1404. A second end 1610 of the drive shaft 1604 is coupled to a coupling 1612 of the second clutch 1602 (e.g., a holding clutch). Thus, in the illustrated example, the first clutch 1600 operatively couples the manual controller 920 to the second clutch 1602. In some examples, the manual controller 920 and/or the first clutch 1600 includes a gearbox (e.g., a planetary gearbox) to increase a torque output of the manual controller 920.

In the illustrated example, the coupling 1612 includes a first bore 1614 and a second bore 1616 opposite the first bore 1614. The example first bore 1614 receives the second end 1610 of the drive shaft 1604. The example second bore 1616 receives a motor drive shaft 1618 and a core 1620 of the frame 1404. In the illustrated example, the core 1620 of the frame 1404 includes a brake shaft 1622 extending from a frame collar 1624. The motor drive shaft 1618 of the illustrated example includes a center or core shaft 1626 and an outer shaft 1628 concentric to the center shaft 1626.

FIG. 18 is a cross-sectional view of the clutch assembly 1400 taken along line 18A-18A. In the illustrated example, the second bore 1616 of the coupling 1612 includes a pair of inwardly extending splines or ridges 1800, 1802 (e.g., parallel key splines). The example outer shaft 1628 includes opposing slits or clefts 1804, 1806, which receive the splines 1800, 1802 of the coupling 1612.

As illustrated in FIGS. 16 and 18, the brake shaft 1622 is disposed around the center shaft 1626 in a space defined between the center shaft 1626 and the outer shaft 1628. In the illustrated example, the frame collar 1624 of the core 1620 is coupled to the frame 1404. In some examples, the frame 1404 and the core 1620 are integrally formed.

The example second clutch 1602 includes one or more wrap springs 1808 disposed around the example brake shaft 1622. In some examples, each of the wrap springs 1808 includes four coils. However, wrap springs including other numbers of coils are used in other examples. Each example wrap spring 1808 includes a first tang or arm 1810 on a first end of the spring 1808 and a second tang or arm 1812 on a second end of the spring 1808. In the illustrated example, the wrap springs 1808 are oriented such that the first tang 1810 of each of the wrap springs 1808 is disposed in the slit 1804 of the outer shaft 1628 adjacent one of the splines 1800, 1802 of the coupling 1612, and the second tang 1812 is disposed in the slit 1806 adjacent the other the one of the splines 1800, 1802. Thus, if the example motor drive shaft 1618 rotates during operation, the outer shaft 1628 engages one of the tangs 1810, 1812 of the wrap springs 1808, and if the coupling 1612 rotates during operation, one of the splines 1800, 1802 of the coupling 1612 engage one of the tangs 1810, 1812 of the wrap springs 1808. If the coupling 1612 engages one of the tangs 1810, 1812, the corresponding coil(s) of the springs 1808 tighten around the brake shaft 1622 to resist relative movement between the frame 1404 and the second clutch 1602. If the outer shaft 1628 of the motor drive shaft 1618 engages one of the tangs 1810, 1812, the coils loosen around the brake shaft 1622 to release resistance to relative movement between the second clutch 1602 and the frame 1404.

The center shaft 1626 of the example motor drive shaft 1618 is coupled to an output shaft 1630 of the motor 1402 via a coupling 1632. In the illustrated example, the coupling 1632 includes a plurality of noise and/or vibration insulators 1634, 1636 such as, for example, one or more rubber grommets. In the illustrated example, the motor 1402 is an electric motor (e.g., a 12-24V DC motor) and includes a gearbox or a transmission. The example motor 1402 is able to operate at speeds up to about 6000 rpm and the gearbox provides approximately a 130:1 ratio between the speed of the motor 1402 and a speed of a motor output shaft 1630. The motor 1402 and the gearbox are disposed inside a housing 1638, which is coupled to the frame 1404 via one or more mechanical fasteners 1640 and sound or vibration insulators 1642, 1644 such as, for example, one or more rubber grommets.

During operation, the motor 1402, the manual controller 920, or both may rotate the tube 904 and, thus, wind and/or unwind the covering 906 (i.e., lower or raise the covering 906, respectively). For example, when the motor 1402 drives the motor drive shaft 1618, the outer shaft 1628 of the motor drive shaft 1618 engages one of the tangs 1810, 1812 on each of the wrap springs 1808, thereby loosening the wrap springs 1808 around the brake shaft 1622. If the manual controller 920 is not operated during this time, the male connector 1100 of the manual controller 920 prevents the motor drive shaft 1618 from rotating the second clutch 1602. Thus, motor drive shaft 1618 is held substantially stationary, which causes the motor 1402 to rotate about the motor output shaft 1630. As a result, the motor 1402 rotates the frame 1404 and, thus, the tube 904.

If the manual controller 920 is operated (e.g., by a user pulling the cord 1000 with sufficient force), and the motor 1402 is not driven (e.g., during a power outage, manual operation by a user without access to a central controller or other electronic controls, etc.), the male connector 1100 rotates, thereby causing the female connector 1410, the drive shaft 1604, the coupling 1612, and the motor drive shaft 1618 to rotate. As a result, the coupling 1612 engages one of the tangs 1810, 1812 of each of the wrap springs 1808 to cause the wrap springs 1808 to tighten around the brake shaft 1622 and, thus, transfers the torque applied from the manual controller 920 to the frame 1404 to cause the roller tube 904 to rotate. In the illustrated example, the wrap springs 1808 include tangs 1810, 1812 on both sides of the one of the splines 1800, 1802 of the coupling 1612. Thus, rotation of the coupling 1612 in the winding direction and the unwinding direction causes the wrap springs 1808 to tighten around the brake shaft 1626. As a result, the covering 906 may be selectively raised or lowered by a user via the manual controller 920 (e.g., without electrical power supplied to the motor 1402).

Movement of the motor 1402 and, thus, the tube 904 is additive to movement of the motor drive shaft 1618. For example, if the manual controller 920 causes the motor drive shaft 1618 to rotate at a velocity of 20 revolutions per minute in a first direction, and the motor 1402 is driven to rotate about the output shaft 1630 at a velocity of 25 revolutions per minute in a second direction opposite the first direction, then the tube 904 rotates in the second direction at a velocity of 5 revolutions per minute. In another example, if the manual controller 920 causes the motor drive shaft 1618 to rotate at a velocity of 20 revolutions per minute in the first direction, and the motor 1402 is driven to rotate about the output shaft 1630 at a velocity of 25 revolutions per minute in the first direction, the tube 904 rotates in the first direction at a velocity of 45 revolutions per minute. Thus, the manual controller 920 and the motor 1402 may cooperate or compete to assist or prevent movement of the tube 904 via the manual controller 920.

During operation of the architectural opening covering assembly 900, if the tube 904 rotates to fully unwind the covering 906 (i.e., the covering 906 is at a fully unwound position), the motor 1402 drives the drive shaft 1604 through the dead band of the first clutch 1600. For example, as the covering 906 unwinds, the motor 1402 applies a first torque to the tube 904 in a first direction (e.g., counterclockwise) and a weight of the covering 906 applies a second torque to the tube 904 greater than the first torque in a second direction opposite the first direction (e.g., clockwise). As a result, the teeth 1704, 1706 of the drive shaft 1604 engage the teeth 1700, 1702 of the female connector 1410, and the motor 1402 allows the weight of the covering 906 to cause the tube 904 and the motor 1402 to rotate together to unwind the covering 906. If the tube 904 unwinds past the fully unwound position (i.e., where the covering 906 fully unwinds from the tube 904), the weight of the covering 906 applies torque to the tube 904 in the first direction. As a result, the motor 1402 drives the teeth 1704, 1706 of the drive shaft 1604 out of engagement with the teeth 1700, 1702 of the female connector 1410 for a portion of a revolution (e.g., 160 degrees), but the tube 904 remains substantially stationary while the motor 1402 is operating. As described in further detail below, the disengagement may be detected (e.g., by detecting that the motor 1402 is operating but the tube 902 is not rotating) to determine a fully unwound position of the covering 906.

FIG. 19 is a perspective view of an example local controller 1900. The example local controller 1900 is disposed inside of and coupled to the roller tube 904. In the illustrated example, the local controller 1900 includes a housing 1902.

A first portion 1104 of the example housing 1902 is coupled to the tube 904, and a second portion 1106 of the housing 1902 is journalled to a second bracket 1908 via a slip ring or rotary electronic joint 1910. In some examples, the second bracket 1908 is mounted to a wall or an architectural opening frame. During operation, the housing 1902 rotates with the tube 904 about an axis of rotation of the tube 904.

Figure 20:
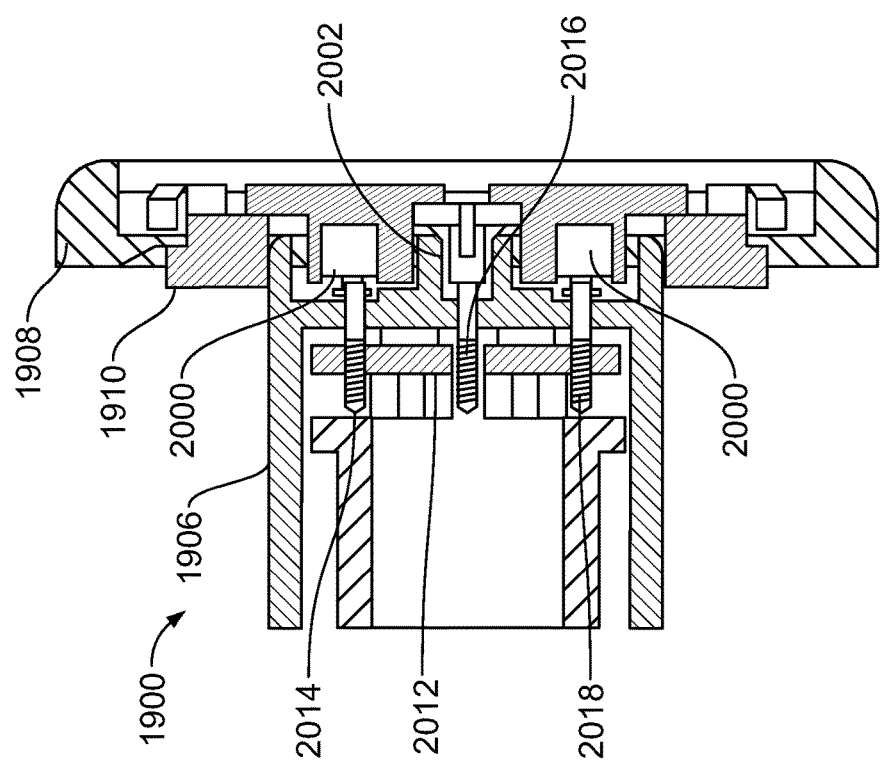
FIG. 20 is a cross-sectional view of a portion of the example local controller of FIG. 19 communicatively coupled to an example central controller and an example power source.

FIG. 20 is a cross-sectional view of the example second bracket 1908 and the second portion 1106 of the example housing 1600. In the illustrated example, the slip ring 1910 includes two electrical contacts 2000, 2002. A central controller and/or a power source may be coupled to the electrical contacts 2000, 2002 via wires.

The example local controller 1900 of FIG. 20 includes a circuit board 2012, which is coupled to the second portion 1106 of the housing 1902 adjacent the electrical contacts 2000, 2002. The circuit board 2012 includes three spring-loaded, conductive pins 2014, 2016 and 2018. When the housing 1902 is coupled to the slip ring 1610, the pins 2014, 2016 and 2018 are biased into engagement with the electrical contacts 2000, 2002 by the included springs.

Figure 21:
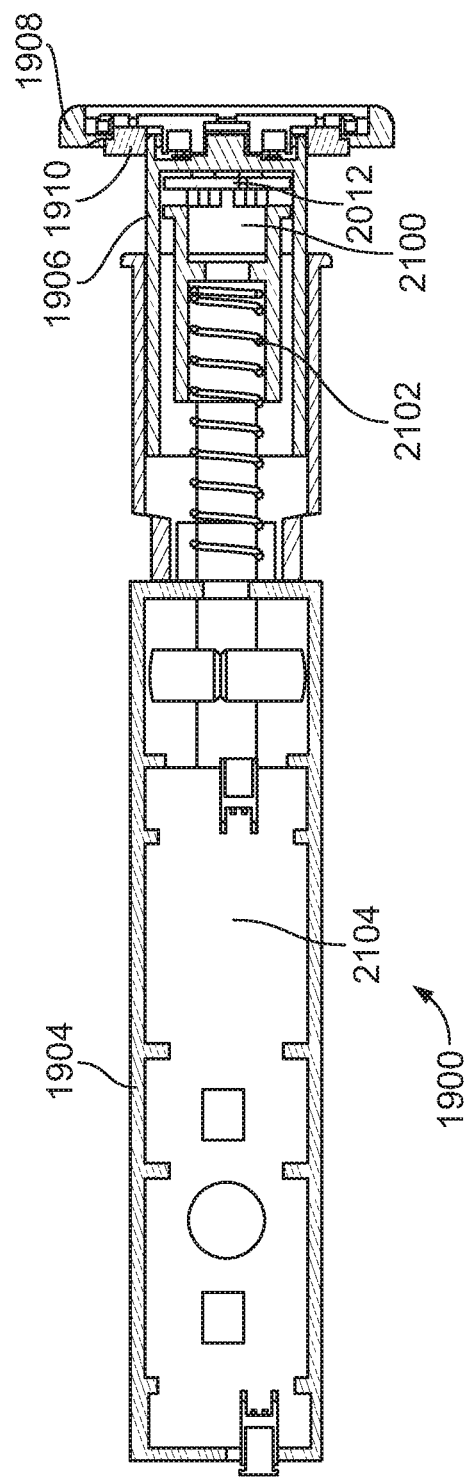
FIG. 21 is another cross-sectional view of the example local controller of FIG. 19.

FIG. 21 is another cross-sectional view of the example housing 1902 and the example bracket 1908. In the illustrated example, the second portion 1106 of the housing 1902 is slidably coupled to the first portion 1104 of the housing 1902. A plunger 2100 is disposed inside the second portion 1106 of the housing 1902 and a spring 2102 seated between the first portion 1104 of the housing 1902 and the plunger 2100 biases the circuit board 2012 toward the second bracket 1908 to urge the pins 2014, 2016 and 2018 into engagement with the electrical contacts 2000, 2002.

In the illustrated example, a control board 2104 is disposed inside the first portion 1104 of the housing 1902. The example local controller 1900 is coupled to the motor 1402 and may be communicatively coupled to a central controller, a wired or wireless remote control, or any other device for instructing the local controller. During operation, the local controller 1900 transmits signals to the motor 1402 to cause the motor 1402 to rotate the tube 904, allow the tube 904 to rotate, and/or hold the tube 904 substantially stationary.

Figure 22:
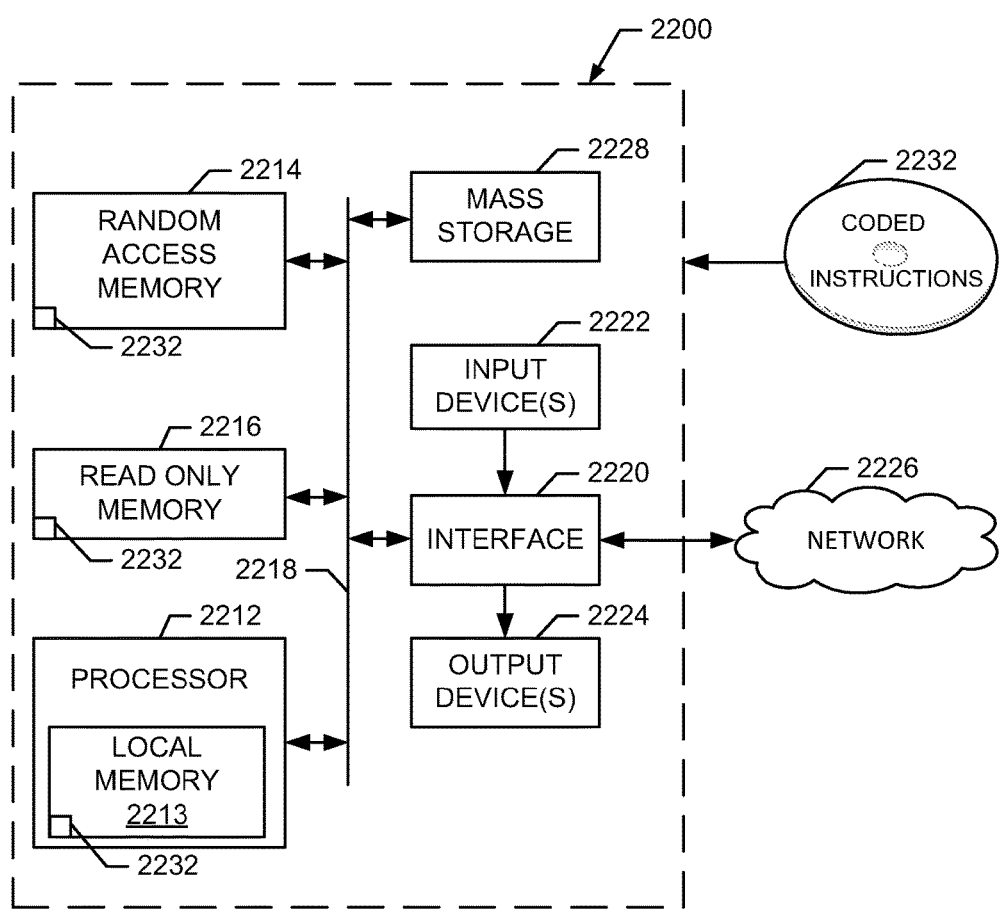
FIG. 22 is a block diagram of an example processor platform to execute the machine readable instructions of FIGS. 3-6 to implement a controller of the control board of FIG. 1, the control board of FIG. 19, or any other controller.

FIG. 22 is a block diagram of an example processor platform 2200 capable of executing the instructions of FIGS. 3-6 to implement a controller of, for example, the controller board 120 of FIG. 1, the local controller 1900 of FIG. 19, and/or any other controller. The processor platform 2200 can be, for example, a server, a personal computer, or any other suitable type of computing device.

The processor platform 2200 of the instant example includes a processor 2212. For example, the processor 2212 can be implemented by one or more microprocessors or controllers from any desired family or manufacturer.

The processor 2212 includes a local memory 2213 (e.g., a cache) and is in communication with a main memory including a volatile memory 2214 and a non-volatile memory 2216 via a bus 2218. The volatile memory 2214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2216 may be implemented by flash memory and/or any other desired type of memory device. Access to the main memory 2214, 2216 is controlled by a memory controller.

The processor platform 2200 also includes an interface circuit 2220. The interface circuit 2220 may be implemented by any type of interface standard, such as an Ethernet interface, a universal serial bus (USB), and/or a PCI express interface.

One or more input devices 2222 are connected to the interface circuit 2220. The input device(s) 2222 permit a user to enter data and commands into the processor 2212. The input device(s) can be implemented by, for example, a keyboard, a mouse, a touchscreen, a track-pad, a trackball, isopoint, a button, a switch, and/or a voice recognition system.

One or more output devices 2224 are also connected to the interface circuit 2220. The output devices 2224 can be implemented, for example, by display devices (e.g., a liquid crystal display, speakers, etc.).

The processor platform 2200 also includes one or more mass storage devices 2228 (e.g., flash memory drive) for storing software and data. The mass storage device 2228 may implement the local storage device 2213.

The coded instructions 2232 of FIGS. 3-6 may be stored in the mass storage device 2228, in the volatile memory 2214, in the non-volatile memory 2216, and/or on a removable storage medium such as a flash memory drive.

Although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

The invention claimed is:

1. An apparatus comprising:
a roller tube;
a motor including a motor drive shaft and a motor casing, the motor casing mounted to rotate with said roller tube; and
a manual control including a manual control drive shaft rotatable with the motor drive shaft, said manual control structured to apply a first torque to the motor drive shaft in response to a manually applied force to cause rotation of the motor casing and said roller tube, said motor structured to apply a second torque to said roller tube to rotate said roller tube while the motor drive shaft does not rotate relative to said manual control;
wherein the first torque and the second torque are additive to increase a rate of rotation when in the same direction, or subtractive when in the opposite directions.

2. The apparatus of claim 1, further including a hold to keep said manual control substantially stationary while said manual control is not operated.

3. The apparatus as defined in claim 2, wherein said hold is structured to hold the motor drive shaft stationary during operation of said motor when said manual control is not operated.

4. The apparatus as defined in claim 2, wherein said hold is a first hold, further including a second hold to prevent rotation of the motor drive shaft while said motor is not operated.

5. The apparatus as defined in claim 4, wherein said motor includes said second hold.

6. The apparatus as defined in claim 5, wherein said second hold is a brake.

7. The apparatus of claim 4, further including a gearbox having a gearbox drive shaft coupled to the motor drive shaft.

8. The apparatus as defined in claim 7, wherein said gearbox includes said second hold.

9. The apparatus as defined in claim 7, wherein said gearbox includes a gearbox casing, the rotation of the motor casing to rotate the gearbox casing.

10. The apparatus as defined in claim 7, wherein the motor casing is coupled to said roller tube via said gearbox.

11. The apparatus as defined in claim 7, wherein the motor drive shaft is coupled to the manual control drive shaft by the gearbox drive shaft.

12. The apparatus as defined in claim 1, wherein the manually applied force is a manually applied rotational force.

13. The apparatus as defined in claim 2, wherein said hold is a one-way clutch.

14. The apparatus as defined in claim 1, wherein the motor casing and the motor drive shaft are both contained within said roller tube and the manual control drive shaft is partially contained within said roller tube.

15. An apparatus comprising:
a roller tube;
a motor including a motor drive shaft and a motor casing, the motor casing mounted to rotate with said roller tube; and
a manual control including a manual control drive shaft rotatable with the motor drive shaft;
wherein:
said manual control is structured to apply torque to the motor drive shaft in response to a manually applied force to cause rotation of the motor casing and said roller tube;
said motor is structured to apply torque to said roller tube to rotate said roller tube while the motor drive shaft does not rotate relative to said manual control; and
while said manual control is not operated, the manual control drive shaft is substantially stationary to hold the motor drive shaft substantially stationary during operation of said motor.

16. The apparatus as defined in claim 15, wherein said manual control is structured to apply a first torque and said motor is structured to apply a second torque.

17. The apparatus as defined in claim 16, wherein, when the first torque is applied in a first direction and the second torque is applied in a second direction opposite the first direction, the first torque and the second torque are subtractive to decrease a rate of the rotation.

18. The apparatus as defined in claim 16, wherein, when the first torque is applied in a first direction and the second torque is applied in the first direction, the first torque and the second torque are additive to increase a rate of the rotation.

19. An apparatus comprising:
a motor having a motor drive shaft and a motor casing; and
a manual control drive shaft coupled to rotate selectively with the motor drive shaft;
wherein:
the motor casing is mounted to rotate with a roller tube;
the motor drive shaft is coupled to rotate the motor casing when said manual control drive shaft is coupled to the motor drive shaft to cause rotation of the motor drive shaft; and
said motor is structured to apply torque to the roller tube to rotate the roller tube while the motor drive shaft does not rotate relative to said manual control drive shaft.

20. The apparatus as defined in claim 19, further comprising a gearbox having gearbox drive shaft coupled to the motor drive shaft, the motor casing being coupled to the roller tube via said gearbox.

21. An apparatus comprising:
a motor having a rotatable motor drive shaft and a motor casing, the motor casing being coupled to rotate with a roller tube; and
a manual control having a rotatable manual control drive shaft coupled with the motor drive shaft;
wherein:
said motor is structured to apply torque to the roller tube to rotate the roller tube while the motor drive shaft does not rotate relative to said manual control;
when the manual control drive shaft rotates in the same direction as the motor drive shaft, a rate of rotation of the roller tube is increased; and
when the manual control drive shaft rotates in a direction opposite to direction of rotation of the motor drive shaft, the rate of rotation of the roller tube is reduced.

22. The apparatus as defined in claim 21, further including a clutch to selectively engage the manual control drive shaft and the motor drive shaft.

\* \* \* \* \*